US008505025B2

(12) United States Patent  (10) Patent No.: US 8,505,025 B2
Nakamura  (45) Date of Patent: Aug. 6, 2013

(54) METHOD AND APPARATUS FOR RECORDING WEB APPLICATION PROCESS

(75) Inventor: Tomohiro Nakamura, Hachioji (JP)

(73) Assignee: Hitachi, Ltd., Tokyo (JP)

( * ) Notice: Subject to any disclaimer, the term of this patent is extended or adjusted under 35 U.S.C. 154(b) by 1201 days.

(21) Appl. No.: 12/028,272

(22) Filed: Feb. 8, 2008

(65) Prior Publication Data
US 2009/0106769 A1 Apr. 23, 2009

(30) Foreign Application Priority Data
Oct. 22, 2007 (JP) ................................. 2007-273309

(51) Int. Cl.
G06F 3/00 (2006.01)
G06F 9/44 (2006.01)
G06F 15/173 (2006.01)

(52) U.S. Cl.
USPC ........... 719/311; 719/319; 719/313; 717/115; 709/224

(58) Field of Classification Search
None
See application file for complete search history.

(56) References Cited

U.S. PATENT DOCUMENTS

| 6,477,575 | B1* | 11/2002 | Koeppel et al. | 709/224 |
| 7,552,448 | B2* | 6/2009 | Wilson | 719/319 |
| 7,685,273 | B1* | 3/2010 | Anastas et al. | 709/224 |
| 8,205,214 | B2* | 6/2012 | Khijniak et al. | 719/313 |
| 8,234,362 | B2* | 7/2012 | Lu et al. | 717/115 |
| 2002/0099829 | A1* | 7/2002 | Richards et al. | 709/227 |
| 2002/0128925 | A1* | 9/2002 | Angeles | 705/26 |
| 2002/0184363 | A1 | 12/2002 | Viavant et al. | |
| 2003/0131052 | A1* | 7/2003 | Allan | 709/203 |
| 2005/0055458 | A1* | 3/2005 | Mohan et al. | 719/313 |
| 2005/0216844 | A1* | 9/2005 | Error et al. | 717/115 |
| 2007/0150556 | A1 | 6/2007 | Fukuda et al. | |
| 2007/0255821 | A1* | 11/2007 | Ge et al. | 709/224 |
| 2008/0005020 | A1* | 1/2008 | Auvenshine et al. | 705/40 |
| 2008/0046562 | A1* | 2/2008 | Butler | 709/224 |
| 2008/0115149 | A1* | 5/2008 | Rupp et al. | 719/318 |
| 2008/0229323 | A1* | 9/2008 | Mackey | 719/311 |
| 2009/0077565 | A1* | 3/2009 | Frazier | 719/311 |
| 2009/0089629 | A1* | 4/2009 | Hawkins | 714/100 |

FOREIGN PATENT DOCUMENTS

| JP | 11110321 | 4/1999 |
| JP | 2000-76266 | 3/2000 |
| JP | 2003228498 | 8/2003 |
| JP | 2004-537097 | 12/2004 |
| JP | 2007-172377 | 7/2007 |

OTHER PUBLICATIONS

"Active Server Page Guide", Nov. 22, 2000, pp. 1-659.*

(Continued)

Primary Examiner — Tuan Dao
(74) Attorney, Agent, or Firm — Brundidge & Stanger, P.C.

(57) ABSTRACT

A method and apparatus for recording web application processes which enable the overall processing condition of a web system to be checked simply without installing a special tool in a client computer and without taking the trouble of modifying a web application on a server, while coping with an increase in the number of client computers in a scalable manner. When sending a response (web page) to the client computer, a script code for recording processes on the client computer and an ID associated with the log of the web page generating process as saved in the server computer are inserted into the response and the process log is saved in a secure area of the client computer's local disk. Process logs thus saved in the local disk are listed in a web page including a script code for accessing them successively.

16 Claims, 17 Drawing Sheets

(56) References Cited

OTHER PUBLICATIONS

"Proxy based Acceleration of Dynamically Generated Content on the World Wide Web: An Approach and Implementation", Anindya Datta, Chutney Tech., Jun. 2004, pp. 1-41.*

"High Layer Protocol and Service Management Based on Passive Network Traffic Monitoring: the Trace Management Platform", Luciano Gaspary, 2002, pp. 1-8.*

"A Proposal and Implementation of Automatic Detection/Collection System for Cross-Site Scripting Vulnerablility", Omar Ismail, 2004, pp. 1-7.*

"AjaxScope: A Platform for Remotely Monitoring the Client-Side Behavior of Web 2.0 Applications", Emre Kiciman, 2007, pp. 1-14.*

"Introduction to Persistence", 2007 Microsoft Corporation. http://msdn2.microsoft.com/en-us/library/ms533007(d=printer).aspx.

Introduction to JavaScript Programming, May 7, 2007 $2^{nd}$ Ed., pp. 102-105.

"Live Monitoring: Using Adaptive Instrumentation and Analysis to Debug and Maintain Web Applications" 2007.

* cited by examiner

| NO. | URL | TIME OF DAY | ID | CLICK COUNT | COMMUNICATION TIME | RENDERING TIME | OPERATION TIME |
|---|---|---|---|---|---|---|---|
| 1 | http://www.a/page.html | 10:00:40.000 | 100000008 | 1 | 100 msec | 80 msec | 4820 msec |
| 2 | http://www.b/page.html | 10:00:35.000 | 100000007 | 5 | 80 msec | 70 msec | 4580 msec |
| 3 | http://www.c/page.html | 10:00:30.000 | 100000006 | 3 | 50 msec | 30 msec | 4920 msec |
| 4 | http://www.d/page.html | 10:00:25.000 | 100000005 | 2 | 200 msec | 15 msec | 4785 msec |
| 5 | http://www.e/page.html | 10:00:20.000 | 100000004 | 10 | 150 msec | 100 msec | 4750 msec |
| 6 | http://www.f/page.html | 10:00:15.000 | 100000003 | 4 | 40 msec | 90 msec | 4870 msec |
| 7 | http://www.g/page.html | 10:00:10.000 | 100000002 | 8 | 30 msec | 25 msec | 4945 msec |
| 8 | http://www.h/page.html | 10:00:05.000 | 100000001 | 1 | 170 msec | 200 msec | 4630 msec |

| NO. | URL | ACCESS COUNT | FIRST ACCESS | LAST ACCESS | AVERAGE COMMUNICATION TIME | AVERAGE RENDERING TIME | AVERAGE OPERATION TIME |
|---|---|---|---|---|---|---|---|
| 1 | http://www.a/page.html | 10 | 9:00:40.000 | 10:00:40.000 | 100 msec | 80 msec | 1500 msec |
| 2 | http://www.b/page.html | 7 | 8:00:35.000 | 10:00:35.000 | 80 msec | 70 msec | 8000 msec |
| 3 | http://www.c/page.html | 5 | 9:30:30.000 | 10:00:30.000 | 50 msec | 30 msec | 3000 msec |
| 4 | http://www.d/page.html | 4 | 7:30:25.000 | 10:00:25.000 | 200 msec | 15 msec | 3000 msec |
| 5 | http://www.e/page.html | 3 | 8:30:20.000 | 10:00:20.000 | 150 msec | 100 msec | 2000 msec |
| 6 | http://www.f/page.html | 2 | 9:20:15.000 | 10:00:15.000 | 40 msec | 90 msec | 7000 msec |
| 7 | http://www.g/page.html | 1 | 10:00:10.000 | 10:00:10.000 | 30 msec | 25 msec | 5000 msec |
| 8 | http://www.h/page.html | 1 | 10:00:05.000 | 10:00:05.000 | 170 msec | 200 msec | 4500 msec |

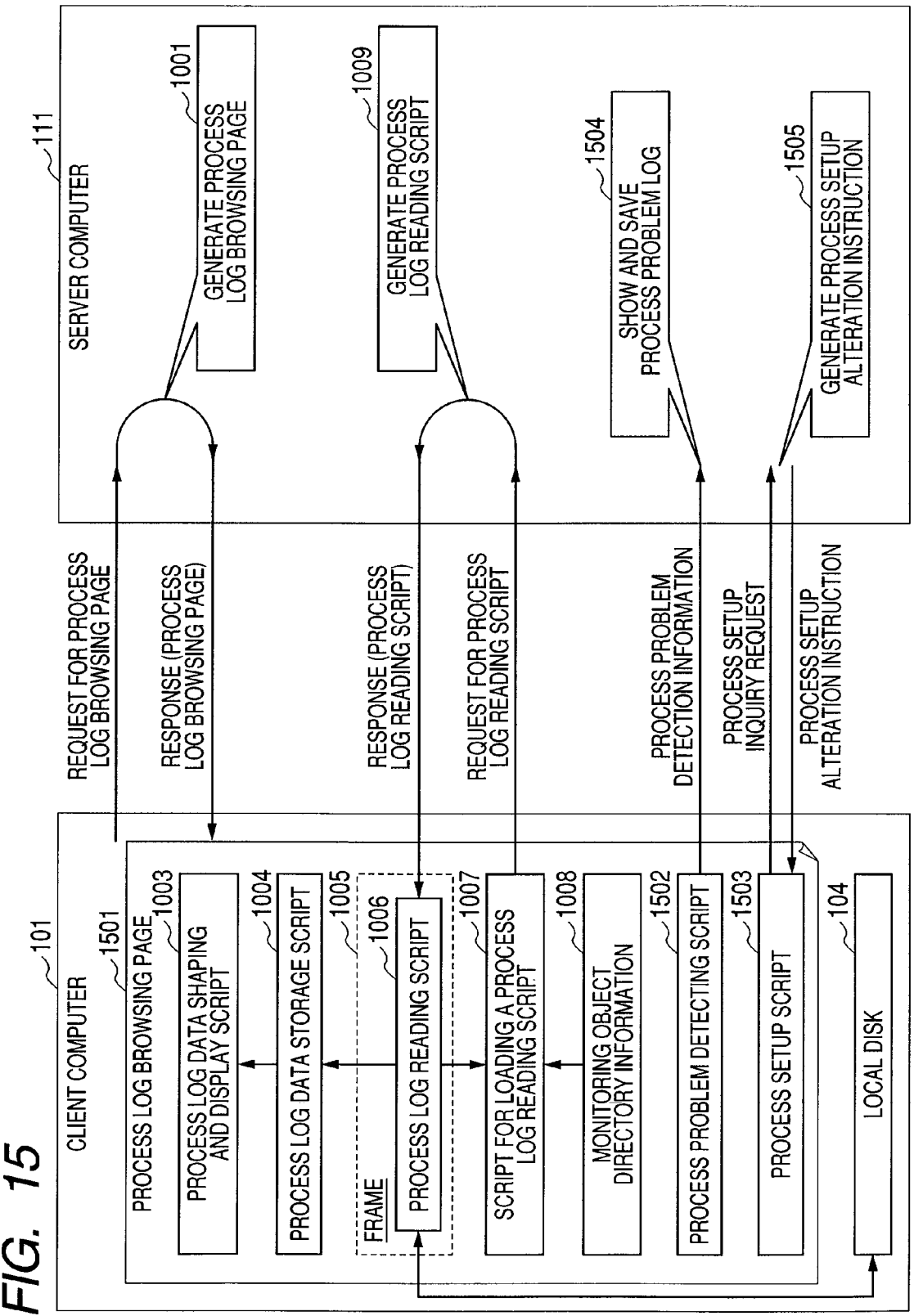

METHOD AND APPARATUS FOR RECORDING WEB APPLICATION PROCESS

CLAIM OF PRIORITY

The present application claims priority from Japanese application JP 2007-273309 filed on Oct. 22, 2007, the content of which is hereby incorporated by reference into this application.

FIELD OF THE INVENTION

The present invention relates to a technique whereby in running a web application in a computer system comprised of a client computer and a server computer or proxy server, the server computer or the proxy server inserts a script code for recording a process on the client computer's web browser into a web page to record the web application's processes on the client and server computers and display the record.

BACKGROUND OF THE INVENTION

Web applications have been increasingly used in a variety of fields including business fields because the rich client technology based on script codes has progressed and they are easily executed if web browsers are installed in client computers. In some application fields, there is strong demand for high availability, good response time and good usability. The rich client technology requires not only the server computer but also the client computer to process larger volumes of data. Since a web application runs on a client-server web system as a network of client and server computers, the availability and performance of the client computer and network as well as those of the server computer must be taken into consideration in order to satisfy the above demand.

On the other hand, in the common method of web system management, the server computer acquires server computer operation logs and error logs to detect problems and measure performance on the server computer side. In connection with the network, though average throughputs are measured, it is difficult to measure individual transactions. The client computer employs the so-called Stopwatch method, a human-assisted method of measuring user-friendliness and user-oriented performance. One recent trend is that a performance measuring tool is installed in the client computer for performance measurement.

However, these methods have drawbacks as follows.

On the part of the server computer, even if a problem is recognized on the client computer, it is very troublesome to find which part of the log acquired by the server computer includes necessary information to know which part of the server computer is defective.

Regarding the network, it is difficult to measure performance for each transaction because numerous communications take place simultaneously.

On the part of client computers, it is difficult in terms of cost and labor to carry out measurements for an extended period at many client computers by a human-assisted method such as the Stopwatch method. If an unspecified number of clients exist, it is also difficult to install a performance measuring tool in each client computer. Besides, collection of measurement results from many client computers in the server imposes burdens on the network and the server.

In addition, which part of the whole web system has caused the problem cannot be known only by performance measurement of each computer.

With this background, several patent and non-patent documents disclose partial solutions to the above drawbacks.

JP-A No. 2000-76266 discloses a method for recording and reproducing user operation on a web browser using JAVA applet and JAVA SCRIPT (registered trademarks). This technique makes it possible to measure client computer operability and performance without installing a special tool in the client computer. However, this technique records only information on operation on the client computer's web browser but does not offer any means to keep a log of processing by the whole web system in conjunction with logs of processes on the server computer, etc. which are required to know how the whole web system has dealt with processes. Regarding storage of process logs in a local disk, though the technique discloses a method which uses a JAVA applet and electronic signature, a more secure and convenient method is anticipated.

U.S. Ser. No. 11/933,610, filed Nov. 1, 2007, describes a method for recording and reproducing user operation on a web application and estimating user action from logs, including an AJAX application. Again this technique neither offers any means to know how the whole web system has dealt with processes nor a method for saving process logs in a local disk.

JP-A No. 2007-172377 discloses a method whereby a tester can effectively confirm behavior of a web page using DHTML (registered trademark) or confirm difference in behavior of the web page between web browsers or give accessibility information on the web page or check adequacy of access. It is a technique for analysis of an internal state of a web application which uses DHTML but neither offers any means to know how the whole web system has dealt with processes nor a method for saving process logs in a local disk.

JP-T No. 2004-537097 discloses a method whereby a server computer sends a code to measure client performance to a client computer and the server is notified of the result of measurement. Although this technique is disclosed as a method for saving the result of measurement in the client computer's memory temporarily or in a persistent storage, it neither offers any means to know how the whole web system has dealt with processes nor a method for saving process logs in a high-security local disk and reading it from the local disk and displaying it.

Furthermore, a non-patent document (Emre Kiciman and Helen Wang, "Live Monitoring: Using Adaptive Instrumentation and Analysis to Debug and Maintain Web Applications", 11$^{th}$ Workshop on Hot Topics in Operating Systems (HotOS XI), San Diego, May 2007) discloses an AJAX-based method for carrying out web application error check or performance profiling. The document shows an example of an actual system using a proxy and the disclosed method concerns a technique of acquiring a log without modifying the web application. Again this technique neither offers any means to know how the whole web system has dealt with processes nor a method for saving process logs in a local disk.

A second non-patent document (Makoto Otsu, "Introduction to JavaScript programming," Second Edition, Ohmsha, Ltd.) discloses a method for acquiring a record of an event on a web browser using JAVA SCRIPT. This technique can be used to create process logs on a client computer.

A third non-patent document (Introduction to Persistence, http://msdn2.microsoft.com/en-us/library/ms533007.aspx) discloses a method for saving data as a web browser persistent data file on Internet Explorer (registered trademark) or reading it. This technique can be used for the web browser to save the data in a local disk.

SUMMARY OF THE INVENTION

For a technique whereby in running a web application in a computer system comprised of a client computer and a server computer or proxy server, the server computer or the proxy server inserts a script code for recording a process on the client computer's web browser into a web page to record the web application's processes on the client and server computers and display the record, the present invention provides solutions which the above known techniques or a combination of them could not offer, as follows.

Firstly, how the whole web system has dealt with processes is recorded and displayed. Here the "whole web system" includes not only the server computer but also the client computer and network. Furthermore, web application operation includes a request for a web page from the client computer, generation of a web page on the server computer, display of the web page on the client computer and operation on the web page, and transmission and receipt of the request and web page on the network and thus a method for interpreting record of these processes as a series of logs is needed. If this method is developed, it will be easy to know which part is responsible for a problem which has occurred on the web application Secondly, processes on the client computer are recorded in a high-security area of the client computer's local disk without the need for installing a special tool in the client computer or modifying the web application on the server computer or other work which might impair usability and without imposing further burdens on the server computer and network so that even when the number of client computers in the network increases, processes are recorded and the record is displayed in a scalable manner.

According to one aspect of the present invention, when a client computer issues a request for a web page, a server computer inserts a script code for recording processes on a web browser on the client computer, and identifications or IDs of the requesting web page and the requested web page into a response (web page) and sends it back to the client computer so that processes are recorded on the client computer without the need for installing a special tool in the client computer. In addition, by saving an ID together with the process logs, the history of access to a web page can be traced. When the ID is the ID of a trace as a log of the web page generating process on the server computer or a value corresponding to the trace ID on one-on-one basis, the log of the process for the web page on the client computer is associated with the log of the process of generating the web page on the server computer. Consequently, how the whole web system has dealt with the processes is recorded.

The script code for recording processes on a web browser has a function to record an event generated when the web browser receives a response from the server computer or when rendering of the response on the web browser is finished, or when the mouse or keyboard is operated or a request for a next web page is sent, and this record may include communication time from request for a web page to response, required rendering time on a web page, browsing/operation time required from completion of rendering to transmission of a next request as well as statistic data such as the number of mouse clicks made on a web page. This is primary information for deciding which part is responsible for a problem in the web application if any. Since the IDs of traces as logs of web page generation processes on the server computer are included in process logs saved in the client computer, if communication time is related to the problem, reference can be made to the relevant trace in the server computer to know details of communication time.

According to another aspect of the invention, in a method for recording a process on the client computer, even when the number of client computers increases, the process is recorded and the record is displayed in a scalable manner with high security as follows. A log of the process on the client computer is saved in the local disk of the client computer. The log is saved not anywhere in the local disk but in a limited area of it which allows the web browser to save or read and allows the data to be saved or read only from a web page in the same directory as the web page on which the data is saved, so that high security is assured. However, process logs cannot be accessed at a time directly from a web page for browsing them; therefore the web page for browsing contains a frame and process log reading scripts are loaded from the relevant area of the local disk into the frame on a directory-by-directory basis and process logs are read from the frame and accumulated in the web page for browsing so that process logs of web pages in more than one directory are displayed at a time.

Accordingly, the present invention offers an advantage that processes on the client computer can be recorded in a simple manner without installing a special tool in the client computer or modifying the web application on the server computer. Also a series of processes in the web system can be confirmed from process logs.

BRIEF DESCRIPTION OF THE DRAWINGS

The invention will be more particularly described with reference to the accompanying drawings, in which:

FIG. 13 shows another example of a process log browsing page in the method for recording web application processes according to the present invention;

FIG. 14 shows a further example of a process log browsing page in the method for recording web application processes according to the present invention;

FIG. 15 explains how a process problem is notified and setup is revised in the method for recording web application processes according to the present invention;

DETAILED DESCRIPTION OF THE PREFERRED EMBODIMENTS

First Embodiment

Next, a preferred embodiment of the method for recording web application processes according to the present invention will be described referring to FIGS. 1 to 15.

First, referring to FIGS. 1 to 3, a web system to which the present invention is applied, the configuration of its web application and its basic process flows will be explained.

Figure 1:
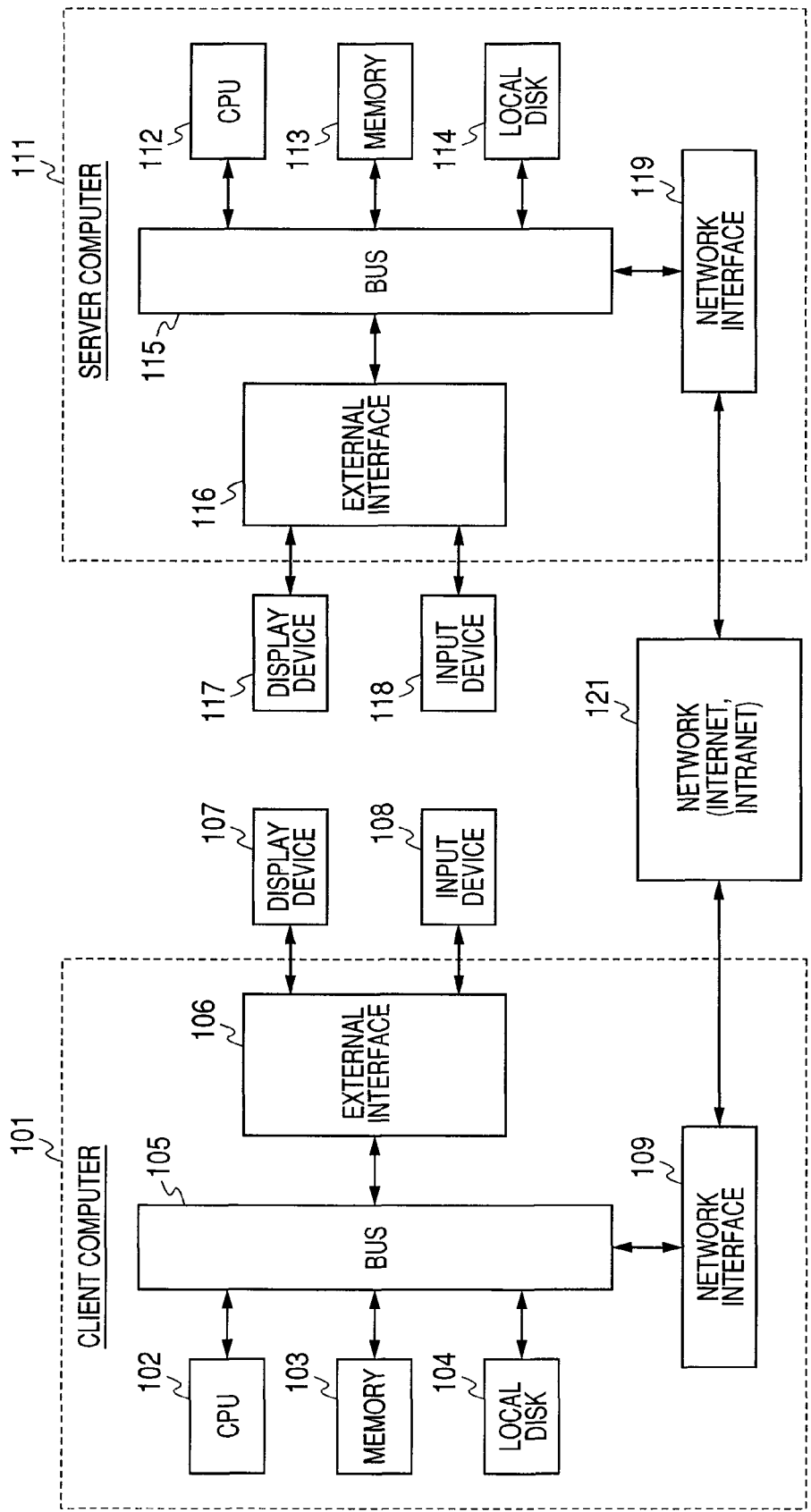
FIG. 1 is a block diagram showing the basic configuration of a web system to which the invention is applied.

FIG. 1 is a block diagram showing the basic configuration of the web system to which the invention is applied.

The web system is roughly divided into a client computer 101, a server computer 111, and a network 121 connecting them. Although one client computer 101 and one server computer 111 are shown in FIG. 1, the web system may have two or more client and server computers. The client computer 101 includes a CPU 102, a memory 103, a local disk 104, an external interface 106, a network interface 109, and a bus 105 connecting them. The external interface 106 is connected with a display device 107 and an input device 108. The display device 107 may be a CRT monitor or a liquid crystal display monitor. The input device 108 may be a keyboard or mouse. The server computer 111 has the same basic structure as the client computer 101. The network 121 is connected with the network interfaces 109, 119 of the client computer 101 and server computer 111 via the Internet or an intranet.

On the client computer 101, the executable code for the operating system and web browser as saved in the local disk 104 is decompressed in the memory 103 and executed by the CPU 2. The web browser receives an instruction from the input device 108 through the external interface 106 and generates a request for a web page and sends the request through the network interface 109 to the network 121. After a response (web page) is received from the server computer 111 through the network interface 109, the web page is displayed through the external interface 106 on the display device 107.

On the server computer 111, the executable code for the operating system and server programs such as a web server and a database server which is saved in the local disk 114 is decompressed in the memory 113 and executed by the CPU 112. The server program receives the request for a web page from the client computer 101 through the network interface 119 and generates a web page and sends a response to the network 121 through the network interface 119. The display device 117 of the server computer 111 shows the server program processing condition and the content of setup and the input device 118 is used to start or end the server program or revise settings for the server program.

Figure 2:
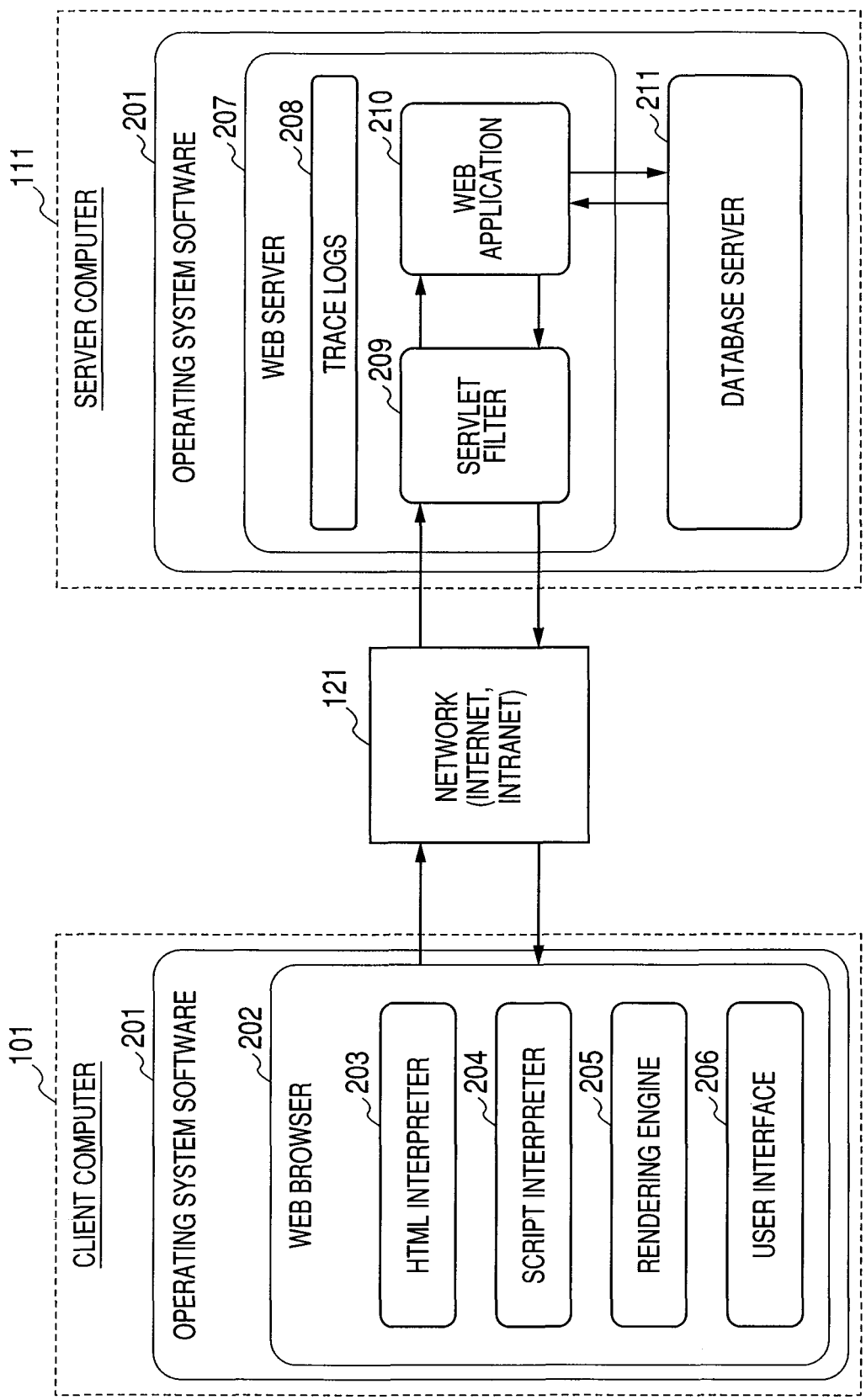
FIG. 2 is a block diagram showing the basic configuration of software which runs on a web system to which the invention is applied.

FIG. 2 is a block diagram showing the basic configuration of software which runs on the web system to which the invention is applied.

On the client computer 101, a web browser 202 is run on an operating system 201. The web browser 202 includes an HTML interpreter 203, a script interpreter 204, a rendering engine 205, and a user interface 206. The HTML interpreter 203 interprets an HTML document contained in a web page response sent from the server computer 111. The script interpreter 204 interprets and executes the script code contained in the web page response. One example of script code is JAVASCRIPT. The rendering engine 205 creates a web page screen image according to the results of execution by the HTML interpreter 203 and script interpreter 204. Usually the created web page screen image is shown on the display device 107 (FIG. 1). The user interface 206 receives data entered through the input device 108 (FIG. 1) and transfers the data to the HTML interpreter 203 and the script interpreter 204 to generate a request for a next web page or update the screen image.

Processes on the client computer include interpretation of HTML documents, execution of script code, creation of web page screen images, receipt of input data, generation of requests, and screen updating as mentioned above. A log of processes on the client computer includes information on the contents of processes such as types of the above processes, time of occurrence, and input data values.

On the server computer 111, a web server 207 and a database server 211 are run on an operating system 201. Although FIG. 2 shows that the web server 207 and database server 211 are run on one operating system 201, instead their server programs may be run on separate operating systems 201. It is also possible that one of the servers is not run or another server (for example, an application server) is run. Also more than one web server 207 or database server 211 may be used. For simple illustration, an application server is not shown in FIG. 2 as it is included in the web server.

In this embodiment, trace logs 208, a servlet filter 209 and a web application 210 reside on the web server 207. The servlet filter 209 receives a request for a web page from the web browser 202 through the network 121 and performs filtering on the request as specified and transfers it to the web application 210. It also performs filtering on a web page response received from the web application as specified and sends it back to the web browser 202 through the network 121. A functional module, so-called container, which controls communications with the web browser exists between the network 121 and servlet filter 209, though for simple illustration it is not shown in FIG. 2. The web application 210 generates a web page as requested. The web application 210 is comprised of a servlet and a program such as JSP or EJB (registered trademarks). For simple illustration, individual engines used to run the web application 210 are not shown in FIG. 2. The web application 210 communicates with the database server 211 as necessary to give and receive required data. The trace logs 208 record processes carried out on the web server 207. For example, a process log includes information on: time of receipt of a request from the network 121, content of a process carried out on the web application 210, ID for communication with the database server 211, content of communication with the database server 211, web application return code, and time of transmission of response from the servlet filter 209 to the network 121. The database server 211 has a database and returns data in response to a search or update request from the web application 210 or updates the database as necessary.

Figure 3:
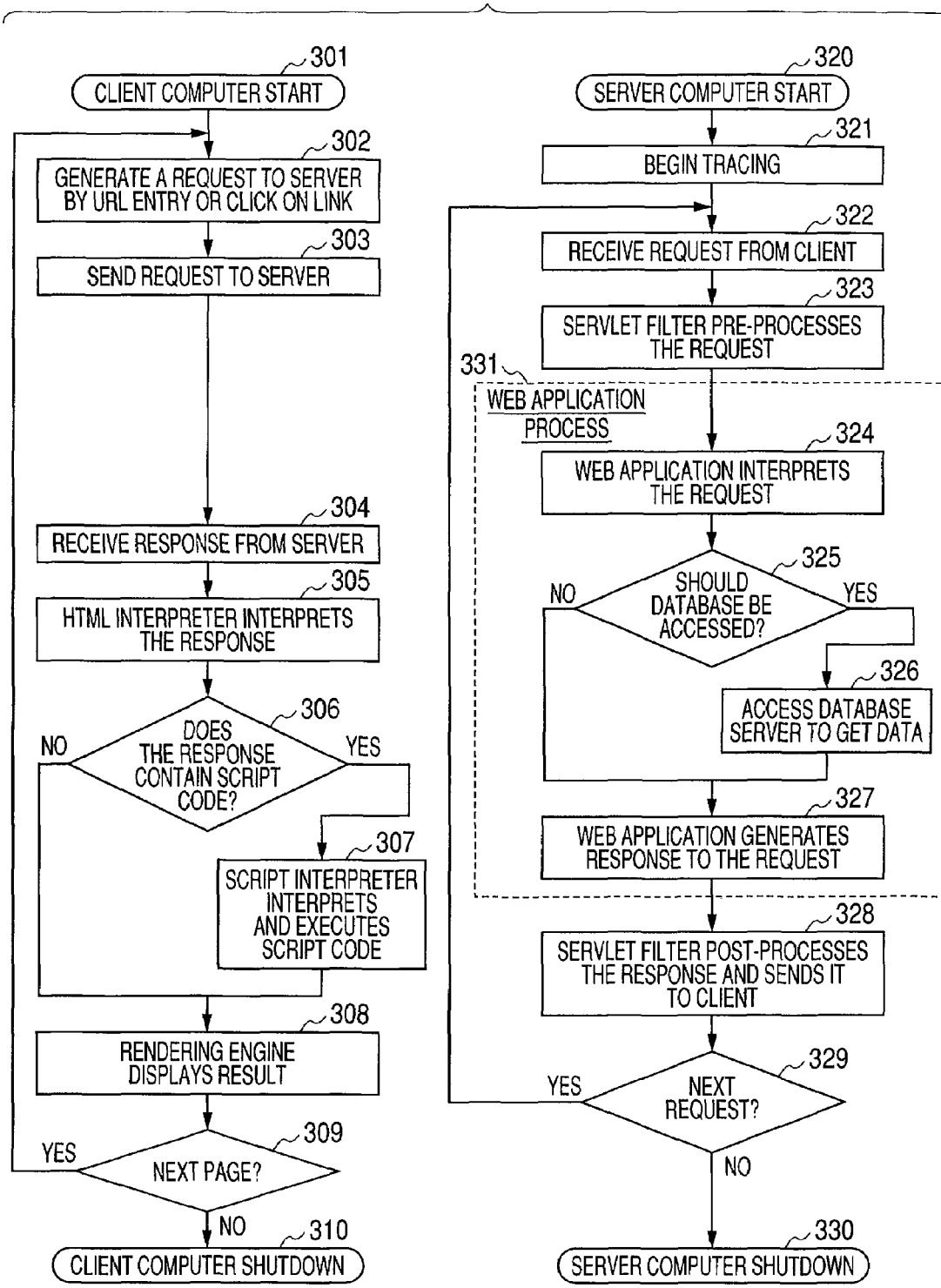
FIG. 3 is a flowchart showing the basic flow of operation of a web application on a web system to which the invention is applied.

FIG. 3 is a flowchart showing the basic flow of operation of a web application on a web system to which the invention is applied. FIG. 3 shows the processing sequence of the client computer and that of the server computer in parallel.

First, the basic processing sequence of the client computer will be explained. The client computer generates a request to be sent to the server computer by entering URL of a web page which the user wishes to access or clicking a link to the web page (Step 302). Then, it sends the generated request to the server computer (Step 303). As it receives a response (requested web page) from the server computer (Step 304), the HTML interpreter of the web browser interprets the response (Step 305) and checks whether the response contains script code (Step 306); if so, the script interpreter interprets and executes the script code (Step 307). Then, the rendering engine displays the process result on the web browser (Step 308). Then, if there is a request for a next web page to be sent to the server computer, the sequence returns to Step 302. If there is no request for a next web page and the web browser should be exited, the sequence goes to Step 310.

Next, the basic processing sequence of the server computer will be explained. As the server computer is started (Step 320), it begins tracing (Step 321). Then, as it receives a request for a web page from the client computer (Step 322), the servlet filter first carries out pre-processing of the request (Step 323). For example, pre-processing includes temporary storage of information contained in the request and recording of time of receipt of the request. Then, a web application process is carried out (Step 331). In the web application process (Step 331), the web application first interprets the request (Step 324) and decides whether to access the database or not (Step 325) and if access to the database is required, the database server is accessed to get or update data (Step 326) and the web application generates a response to the request (Step 327). Then, the servlet filter carries out post-processing of the response and sends the response to the client computer (Step 328). For example, post-processing includes addition of information to the response and recording of time of transmission of the response to the client computer. If there is a next request on the server computer, the sequence returns to Step 322 or if there is no next request and the server computer is ready to be shut down, the sequence goes to Step 330.

The relation between the client computer and server computer processing sequences is as follows. After Step 303 where the client computer sends a request to the server computer, the server computer receives the request from the client computer (Step 322) and generate a response and sends it to the client computer (Step 328); then the client computer receives the response from the server computer (Step 304) and the relevant web page is displayed on the web browser.

Next, the method for recording web application processes according to the present invention will be explained referring to FIGS. 4 to 15.

Figure 4:
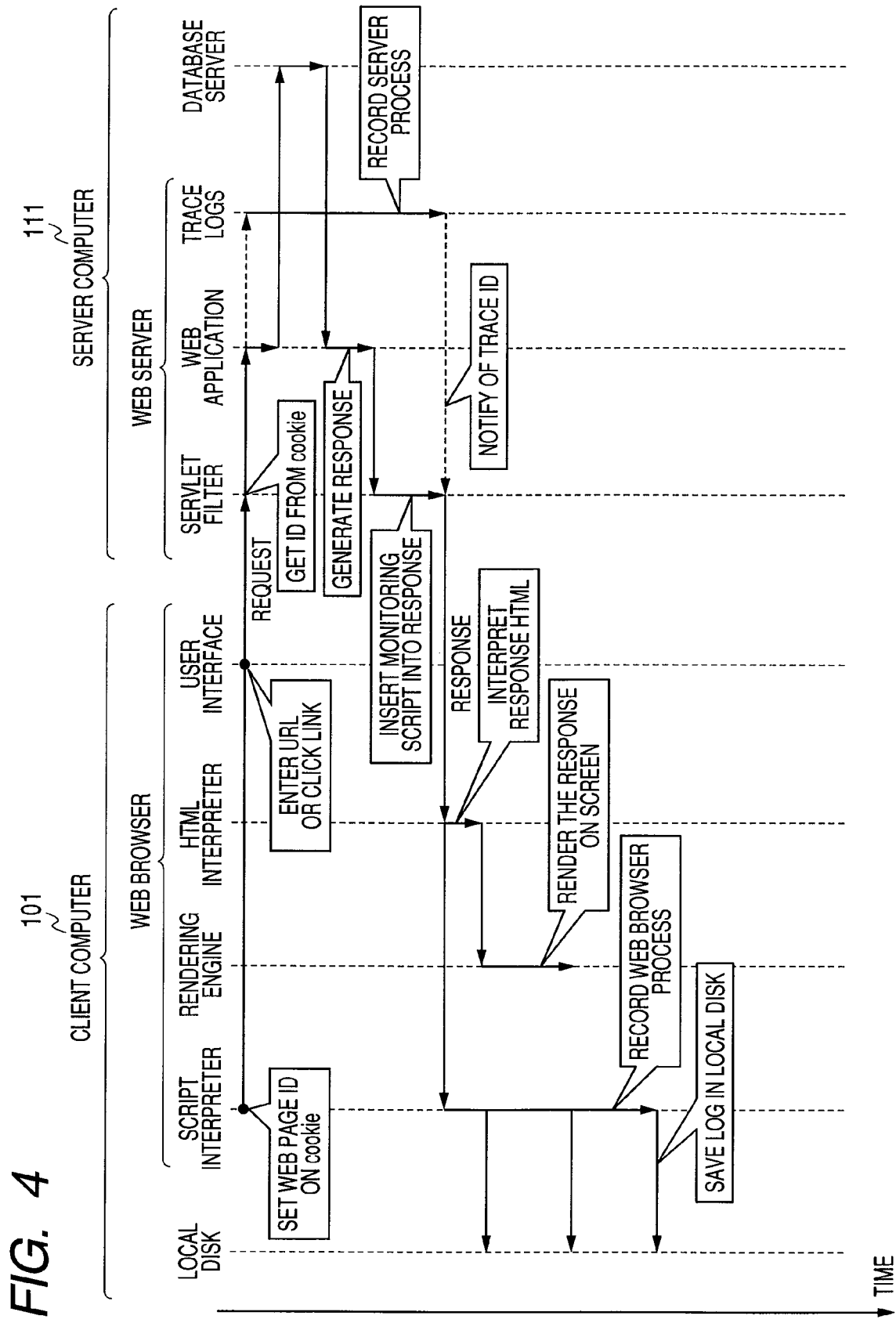
FIG. 4 is a sequence chart showing how a client process is recorded in the method for recording web application processes according to the present invention.
Figure 5:
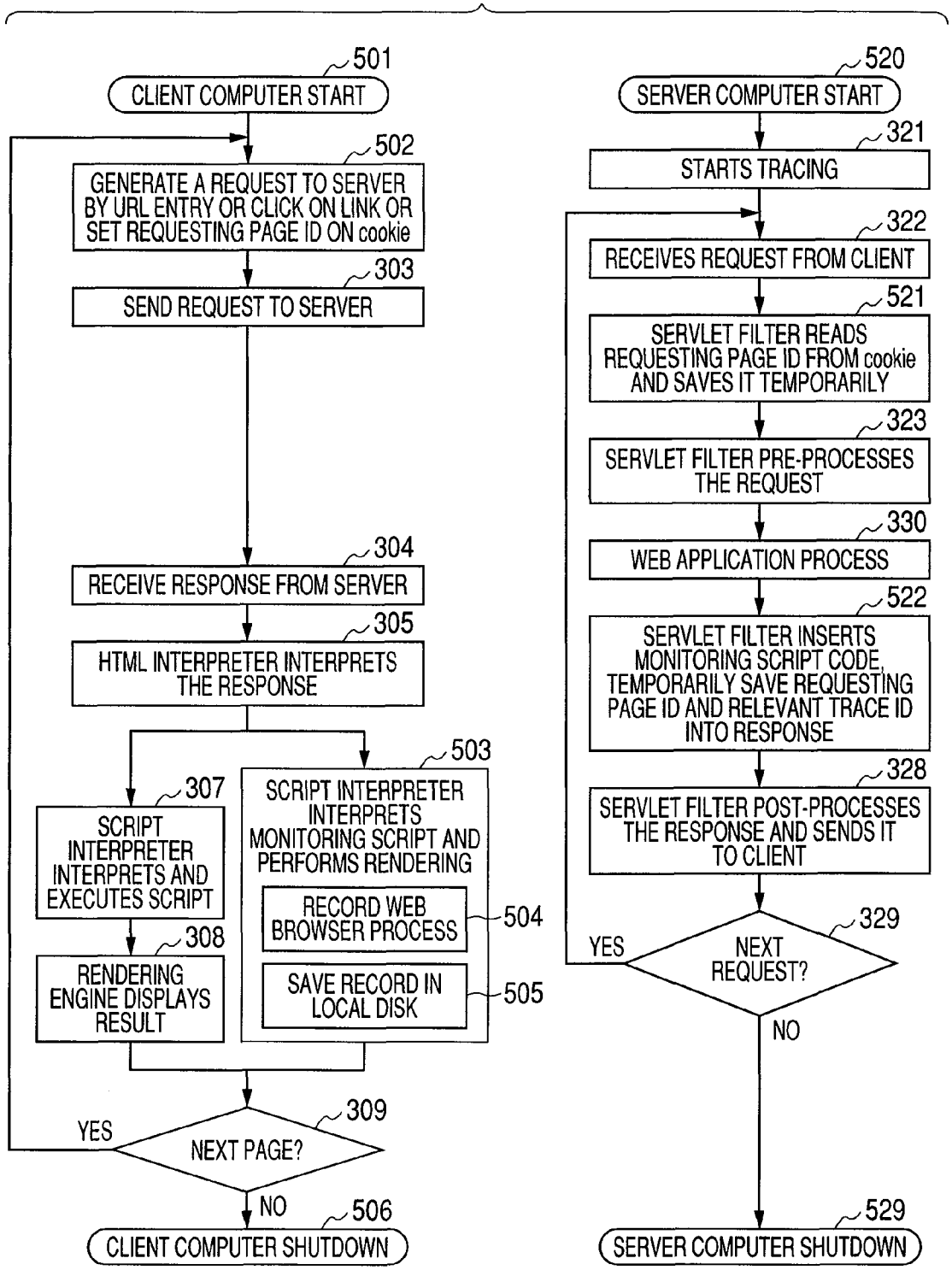
FIG. 5 is a flowchart showing how a client process is recorded in the method for recording web application processes according to the present invention.

FIGS. 4 and 5 are respectively a sequence chart and a flowchart showing how a client process is recorded in the method for recording web application processes according to the present invention.

First, when generating a request for a web page on the web browser, the identification (ID) of the web page issuing the request (requesting web page) is set on a cookie which enables communication of a small volume of data with the server computer, using the script code included in the requesting web page (Step 502). This ID is the ID of a trace as a log of a process on the server computer (mentioned later) or a value which corresponds to it on one-on-one basis. If no web page is displayed on the web browser and a request for a web page is generated by entering the URL of the web page directly, no value is set on the cookie. If the requesting web page is not a web page for which client processes are recorded according to the present invention or it is a web page sent to the client computer before the function of inserting a client process recording script code (illustrated in FIG. 4) into the response from the server computer is started, no value is set on the cookie. After that, the request is sent to the server computer (303).

As the server computer receives the request from the client computer (Step 322), the servlet filter of the web server reads the ID of the requesting web page from the cookie of the request sent from the client computer and temporarily saves it in the memory (Step 521). Then, the servlet filter carries out pre-processing of the request (Step 323) and the web application communicates with the database server as necessary to generate a requested web page response (Step 330). Meanwhile, the web server records the process on the server computer as a trace and assigns an ID to the trace. The trace ID varies from one web page request to another or is unique. Identifications will be explained later in reference to FIG. 9. Next, the servlet filter receives the ID of the trace as a log of the server process for generation of the response, from the trace log. Then, it inserts into the response a monitoring script code for recording processes on the client computer, the ID of the requesting web page temporarily saved in the memory, and the ID of the trace as a log of the server process for generation of the response. Instead of the ID of the trace of the server process, a value which corresponds to the ID on one-on-one basis may be inserted as the ID of the requested web page (Step 522).

The monitoring script code is, for example, a program code described in JAVASCRIPT and inserted into the response HTML using <SCRIPT> tag. The monitoring script code has a function to record an event generated when the web browser receives a response from the server computer or when rendering of the response on the web browser is finished, or when the mouse or keyboard is operated or a request for a next web page is sent and it also has a function to save process logs in the local disk of the client computer together with time of occurrence of the event and web page ID. Another approach to inserting a web page ID into the response is to set it as a variable in the monitoring scrip code.

Next, the servlet filter carries out post-processing of the response and sends the response to the client computer (Step 328). Alternatively, after post-processing, Step 522 may be carried out, before the response is sent to the client computer. The server computer's processing steps before receipt of the request and after transmission of the response are the same as in FIG. 3. As can be understood from the above explanation, the web application process (Step 330) is the same as in FIG. 3, suggesting that the web application process remains unchanged even when the method for recording web application processes according to the present invention is employed.

As the client computer receives the response from the server computer (Step 304), the HTML interpreter interprets the response (Step 305) and the script interpreter interprets and executes the script code (Step 307) and the rendering engine displays the processing result (Step 308). The script interpreter also interprets the monitoring script code inserted into the response on the server computer and executes it (Step 503). Step 503 includes two steps: recording a web browser process (Step 504) and saving the record in the local disk (Step 505). Step 503 and Steps 307 and 308 may be carried out concurrently depending on the location of script code in response HTML or time of web browser process execution or time of occurrence of an event.

Lastly, if there is a request for a next web page to be sent to the server computer, the sequence returns to Step 502. If there is no request for a next web page and the web browser should be exited, the sequence goes to Step 506.

Figure 6:
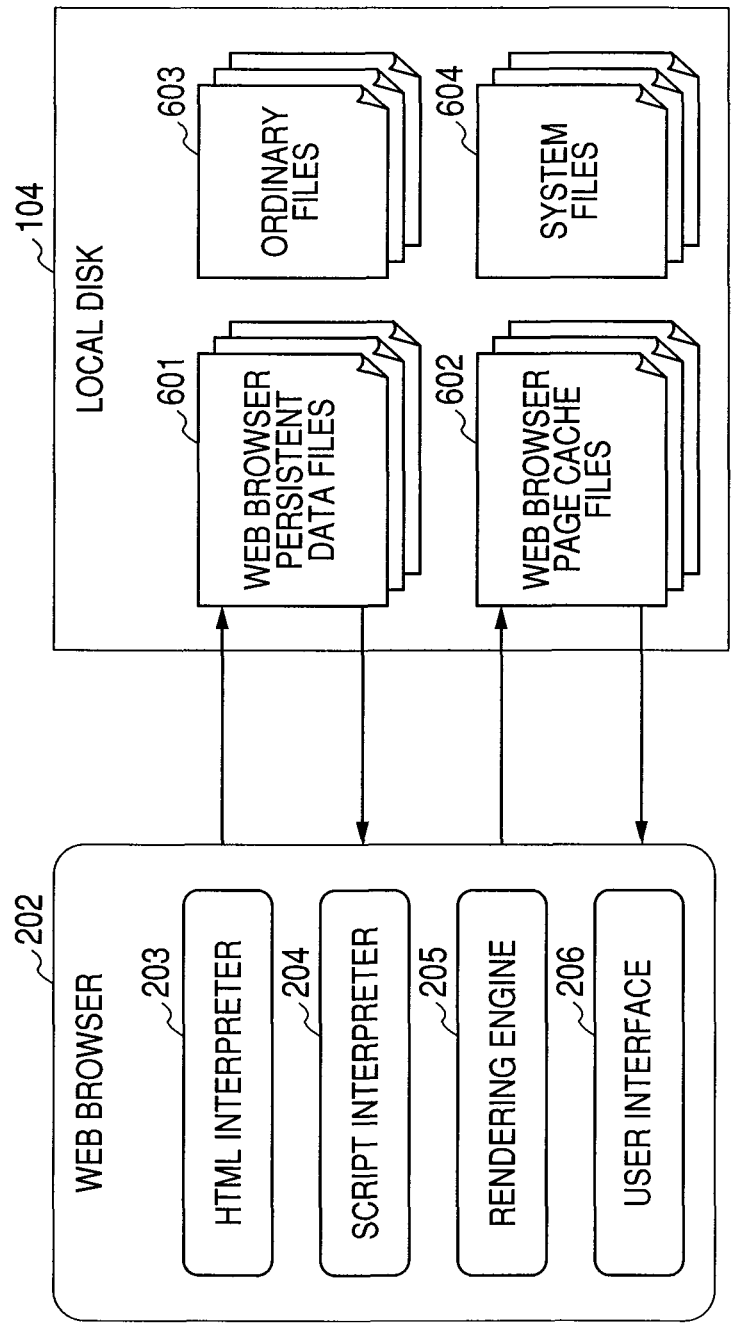
FIG. 6 shows the configuration of a local disk in which the client computer saves a process log, in the method for recording web application processes according to the present invention.

FIG. 6 shows the configuration of the local disk in which the client computer saves process logs in the method for recording web application processes according to the present invention.

Several types of files exist on the local disk 104 of the client computer. For example, system files 604 include an operating system file, a swap file, and an application setup file. Usually the system files 604 are not accessed from a web page on the web browser 202 and cannot be used to save process logs according to the present invention. Web browser page cache files 602 are used as caches for web pages by the web browser 202 in order to display web pages quickly. Usually the web browser page cache files 602 are not accessed from a web page on the web browser 202 and cannot be used to save process logs according to the present invention. Ordinary files 603 include document files and application files. Usually the ordinary files 603 are not accessed from a web page on the web browser 202 and cannot be used to save process logs according to the present invention. Web browser persistent data files 601 are areas available to save data in the local disk 104 from a web page on the web browser 202. The data saved in these areas remain saved under a given condition even after the web browser 202 is exited and thus these files are persistent data files. One example of a web browser persistent data file 601 is a userData area which can be accessed from Internet Explorer. Since usually data can be conditionally read from, or written to, the web browser persistent data files 601, they can be used to save process logs according to the present invention. It may be possible to read from, or write to, files other than the web browser persistent data files 601 using plug-in software incorporated in the web browser 202; however, in that case, there is concern about security since operation of the operating system or application or the content of a document file may be affected. For this reason, when such a file is accessed from the web browser 202, usually a security-related action such as a warning message occurs. Therefore, such files are not suitable as a storage of process logs according to the present invention.

Figure 7:
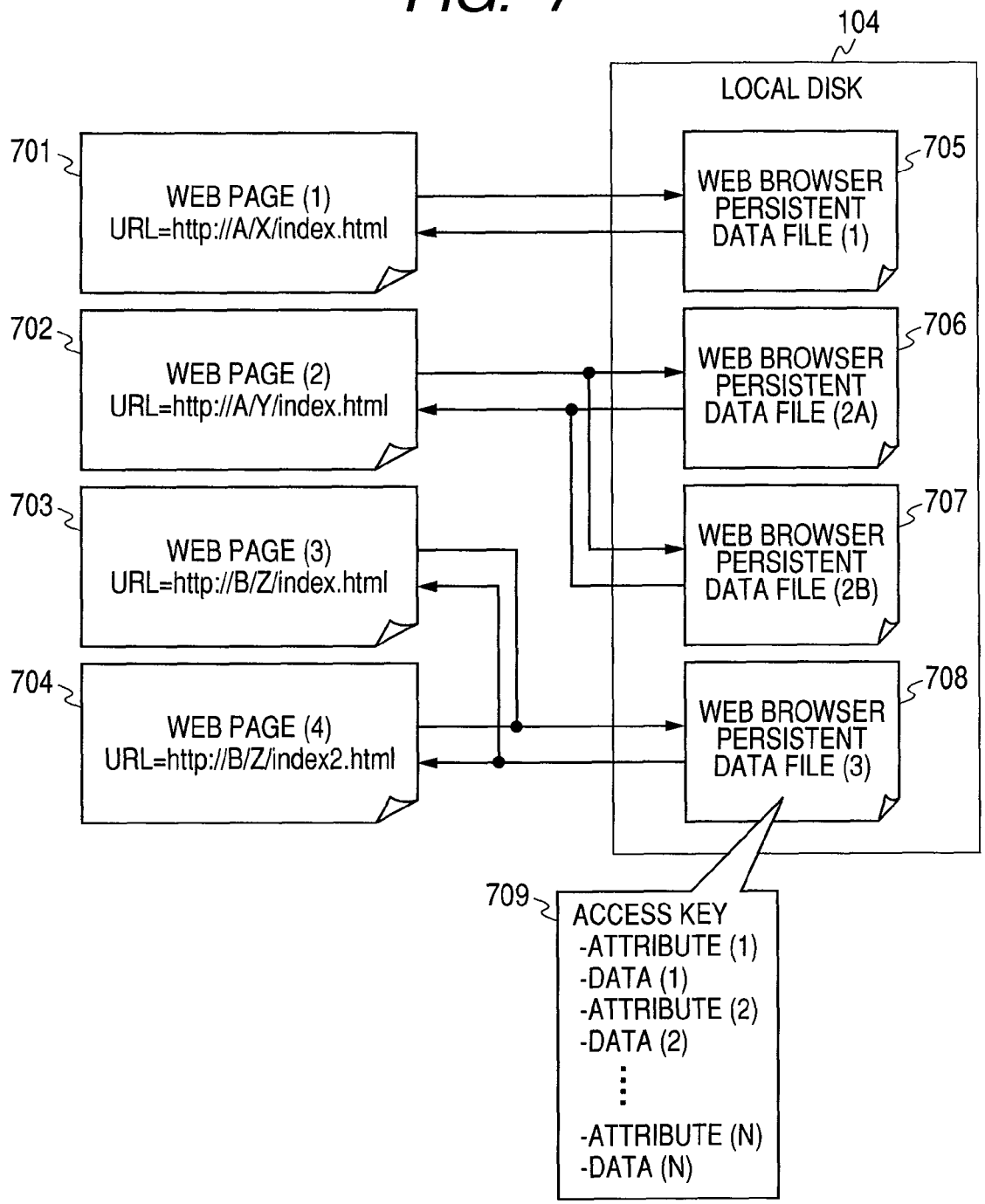
FIG. 7 explains restrictions on web browser persistent data files in which the client computer saves process logs, in the method for recording web application processes according to the present invention.

FIG. 7 explains restrictions on web browser persistent data files in which the client computer saves process logs, in the method for recording web application processes according to the present invention. Usually the web browser data files 601 can be used to read and write data from a web page on the web browser 202 but not unconditionally. This is because if the local disk 104 should be unconditionally available, the local disk 104 would have less free space or a security problem such as unauthorized access by another web application or user could arise. For this reason, in addition to the restriction on memory capacity availability, the following restriction is imposed on the use of web browser persistent data files 601: reading from, or writing to, such a file can be done only from a web page which is in the same directory as the web page whose data is saved there. Furthermore, an access key is set to save data in a web browser data persistent data file 601 and this access key is required to read the data. In the case of FIG. 7, web browser persistent data file (1) 705 in which the data of web page (1) 701 is saved cannot be accessed from web page (2) 702 which is in a directory different from the directory for the web page (1) 701. On the other hand, if the data of web page (2) 702 is saved in web browser persistent data files (2A) 706 and (2B) 707 using two different access keys, both the web browser persistent data files can be accessed from web page (2) 702 using the access keys to read and write data. Web pages (3) 703 and (4) 704 are in a directory and using a common access key, web browser persistent data file (3) 708 can be accessed from both the pages.

Web browser persistent data file 709 contains plural attributes and data sets in addition to an access key required to read and write data. An attribute is used as an index of each datum. For example, if "time" is specified as an attribute and "10:00:00.000" is specified and saved as a datum, the datum "10:00:00.000" can be read by specifying "time" as the attribute. In other words, data from a web browser persistent data file can be read when the script code for reading a web page in the same directory as the web page whose data is saved in the file specifies an attribute using the same access key as used to save the data. In this embodiment, an access key is a web page ID. The ID of a web page is a unique value which corresponds to a trace ID used in generation of the web page on the server computer on one-on-one basis and varies from one request to another, so a different access key is used for each access to the web page and there is no risk that the web browser persistent data file will be overwritten by another access to the web page.

As explained above, since logs of processes on the client computer are saved in a restrictively accessible area of the local disk, the present invention offers the following advantage. Even when the number of clients increases, processes are recorded in a scalable manner without imposing significant burdens on the server computer and the network and the risks of destruction of files in the local disk and unauthorized data access are reduced, thereby permitting higher security in recording and reproduction.

Figure 8:
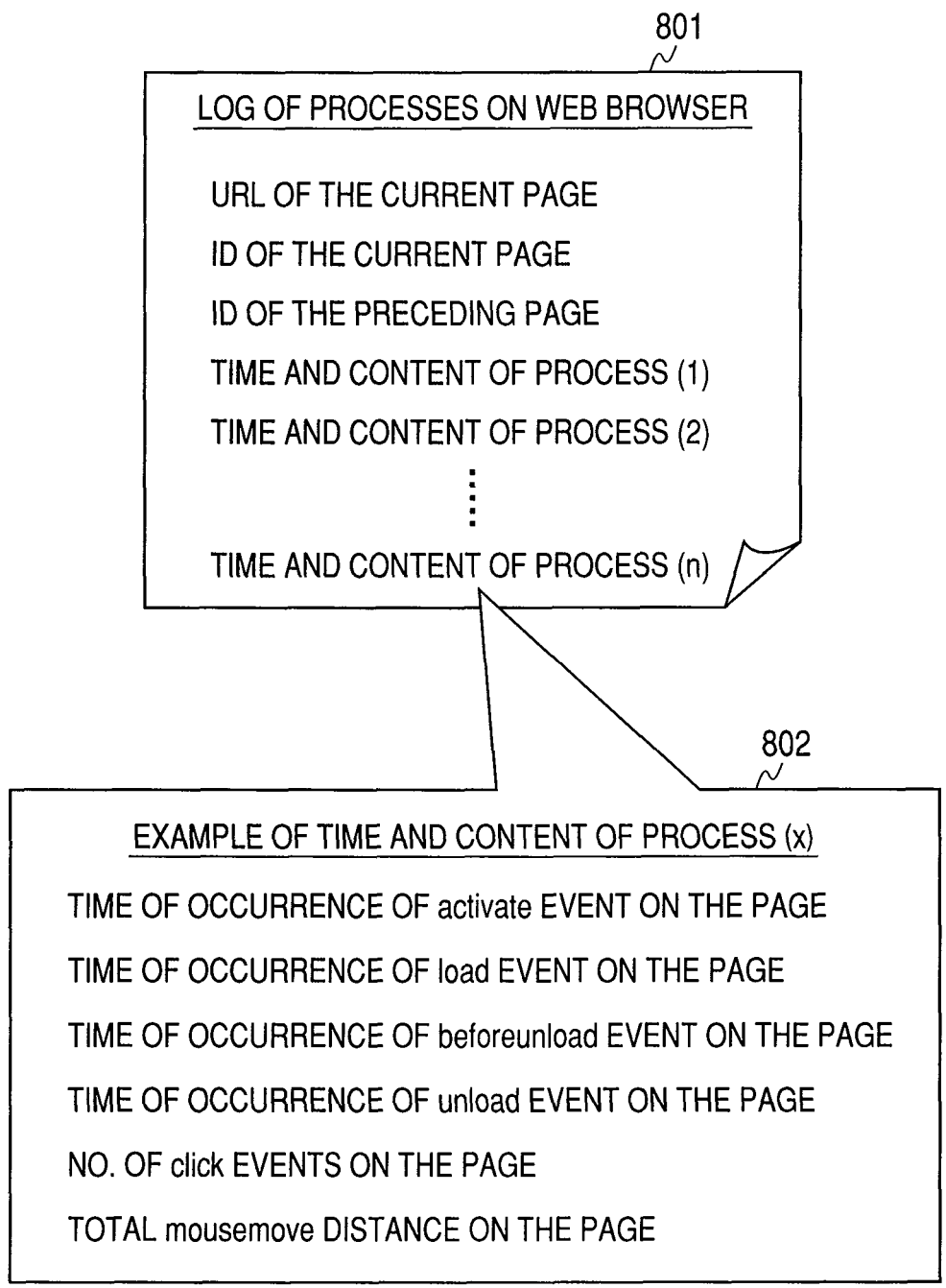
FIG. 8 illustrates the content of a process log saved in the client computer in the method for recording web application processes according to the present invention.

FIG. 8 illustrates the content of a process log saved in the client computer in the method for recording web application processes according to the present invention.

One example of the content of a client process log for each of web pages saved in a web browser persistent data file is as shown in FIG. 8. Specifically the log includes URL and ID of the web page whose process data is recorded, the ID of a web page requesting this web page, and time and content of processes carried out on this page. The purpose of including two IDs in the log is to record the history of access to web pages on the client computer. Specifically, by referring to a client process log for a web page, the ID of the preceding web page which has requested this web page can be obtained and by accessing to the web browser persistent data file using the ID as an access key, the client process log for the preceding web page can be obtained. By repeating this procedure, client processes on previous web pages can be traced back successively.

An example of a process carried out on a web page saved in a process log is an activate event which has occurred on this web page. Taking 802 in FIG. 8 as an example, a concrete example will be explained below.

The activate event is an event which occurs when an object on a web page becomes active. Here, by recording an activate event of the highest-level document object in the document object model (DOM) representing the data structure of the HTML document which describes the content of the web page, it is known that this web page has been received. The load event is an event which occurs when an object is displayed or becomes available on a web browser. Again by recording a load event of the document object, it is known that the web page has been displayed on the web browser.

A beforeunload event is an event which occurs before web page unloading which occurs when the web browser is closed or goes to a next page. Usually a request for a next web page is sent to the server computer after a beforeunload event occurs, though this depends on the web browser installation method. An event similar to this event is an unload event.

Usually an unload event is an event which occurs just before disappearance of the current web page on the web browser, though this depends on the implementation of web browser. The communication time duration from transmission of a request for a web page to receipt of a response can be measured by recording time of occurrence of the beforeunload event in the requesting web page and time of occurrence of the activate event in the requested web page. A request for a next web page can be exceptionally cancelled after occurrence of a beforeunload event. When occurrence of an unload event after a beforeunload event is confirmed, it is known that the request for a next web page has been sent or has not been cancelled.

Not only time of occurrence of an event but the number of click events may be included in a process log. A click event is an event which occurs when a radio button or check box or the like is clicked on a web page with the mouse. Click events, which usually occur through a so-called bubbling process when objects such as buttons in a web page are clicked, can be recorded using a higher-level document object in the document object model for the web page. In other words, by counting click events using the document object, the number of clicks made with the mouse in the web page can be obtained. In addition, by obtaining the positional coordinates of the mouse pointer on the web browser through a mousemove event which occurs with movement of the mouse pointer, the distance for which the mouse has moved can be measured. A process log may record times of occurrence of various events on the web browser other than those shown in FIG. 8 and their details.

Figure 9:
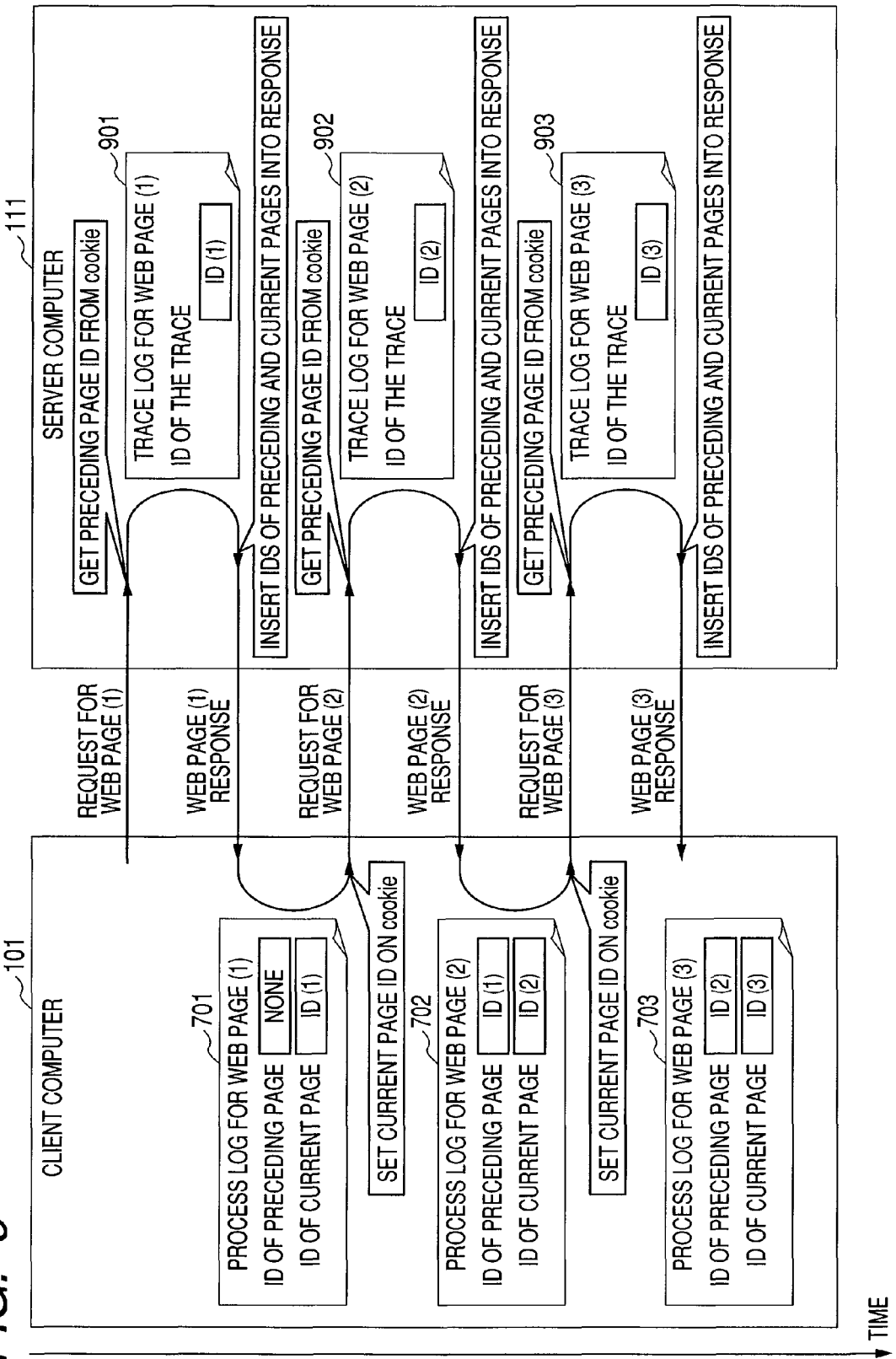
FIG. 9 explains web page IDs in the method for recording web application processes according to the present invention.

FIG. 9 explains web page IDs in the method for recording web application processes according to the present invention.

When the client computer 101 accesses web pages (1), (2) and (3) sequentially, web page IDs are saved in the client process logs for the web pages. How the IDs are transferred between the client computer 101 and the server computer 111 will be explained referring to FIG. 9. For simple illustration, the network and the internal configurations of the client computer 101 and server computer 111 are not shown in FIG. 9.

First, the client computer 101 sends a request for web page (1) to the server computer 111. FIG. 9 shows a case that no web page is loaded on the web browser and the request is issued by directly entering the URL of web page (1) into the address bar of the web browser. Therefore, in this case, the ID of the web page requesting web page (1) is "none". As the server computer 111 receives the request from the client computer 101, an attempt is made to get the ID of the requesting web page, or the page preceding the requested page, from a cookie. However, in this case there is no such web page ID. Then the server computer 111 generates web page (1) while trace 901 as a log of this generation process is given "ID(1)" as its ID. Before sending web page (1) response to the client computer 101, the server computer 111 inserts the ID of the preceding page obtained upon receipt of the request for this web page and the ID of the trace of the generation process of this page as the ID of the web page into the response. On the client computer 101, client process log 701 for web page (1) is saved in the local disk of the client computer 101 using the monitoring code included in the web page (1) response. The client process log 701 for web page (1) saves the ID of the preceding web page and the ID of this web page which are included in the response. In the case of FIG. 9, since there is no web page preceding web page (1), "none" is saved for the ID. Since the ID of the trace log of the generation process of web page (1) is "ID(1)" and included in the response, "ID(1)" is saved as the ID of this web page in the process log 701 for web page (1).

Next, a case that web page (1) requests web page (2) will be explained. Before sending a request for web page (2) to the server computer 111, web page (1) sets the ID of web page (1) ("ID(1)") on the cookie. As the server computer 111 receives the request for web page (2) from the client computer 101, it first gets the ID of the requesting web page (1) from the cookie. In the case of FIG. 9, "ID(1)" is obtained from the cookie and temporarily saved. Then, trace log 902 is generated as in generation of web page (1) and "ID(2)" is given it as its ID. Therefore, "ID(1)" as the ID of the preceding page and "ID(2)" as the ID of this page are inserted into the web page (2) response. Similarly, when web page (2) requests web page (3), the ID of web page (2) ("ID(2)") is set on the cookie and the server computer 111 inserts the ID of the preceding page "ID(2)" and the ID of the trace log 903 of the generation process of web page (3) "ID(3)" into the web page (3) response and sends the response to the client computer 101. Then, the client process log 703 for web page (3) saves "ID(2)" as the ID of the preceding web page and "ID(3)" as the ID of this web page. By saving IDs of subsequent web pages in process logs with the same procedure as above, the history of access to web pages can be traced successively. In addition, since the client process log for a web page contains the ID of the trace log of the generation process of it on the server computer 111 as the ID of that web page, the process logs on both the client computer 101 and the server computer 111 can be traced successively.

As explained above, a value which corresponds to the ID of a trace as a process log on the server computer on one-on-one basis is used as the ID of a client process log for a web page and this is saved together with the process log on the client computer, so that the process log on the client computer and the process log on the server computer are associated with each other and processes in the whole web system are recorded. In addition, since a process log for a web page on the client computer also saves the ID of the web page requesting that web page, the history of access to web pages can be saved and a series of processes in the web system can be recorded.

Figure 10:
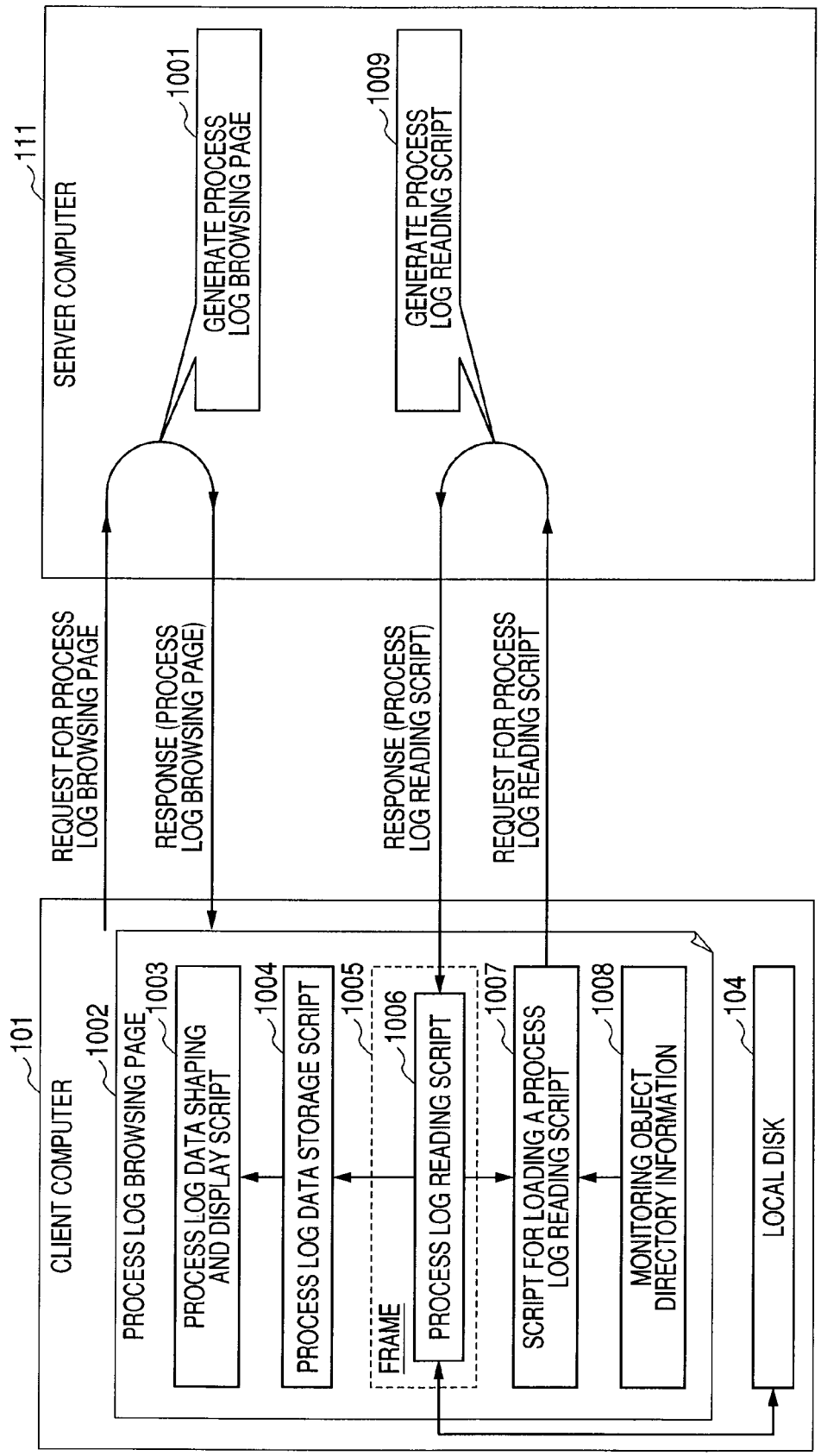
FIG. 10 explains the procedure of browsing a process log in the method for recording web application processes according to the present invention.

FIG. 10 explains the procedure of browsing a process log in the method for recording web application processes according to the present invention.

In order to browse the history of access to web pages and client process logs for various web pages in process logs saved in the local disk 104 of the client computer 101, the process logs saved in the local disk 104 must be read successively. As stated earlier, process logs are saved in web browser persistent data files and the process log for a web page can be read only from a web page in the same directory as that web page. Therefore, in order to read client process logs for web pages in plural directories successively, the process log for each web page must be read from a web page in the same directory as that web page. The process log browsing page 1002 which implements this will be explained below referring to FIG. 10.

The client computer 101 requests the server computer 111 for a page for browsing a client process log (hereinafter called process log browsing page 1002) and the server computer generates a process log browsing page 1002 and sends it back to the client computer 101. The process log browsing page 1002 is roughly divided into five parts. First, the monitoring object directory information 1008 is a list of directories which contain web pages for which process logs are saved. This list is a list of directories which contain web pages for which the monitoring script is inserted into response according to the present invention. However, it may contain such a directory that it has not been accessed actually and process logs for web pages in it are not saved in the local disk 104, though the monitoring script is supposed to be inserted into responses for the web pages. The script for loading a process log reading script 1007 is a script code which gets a list of directories containing web pages for which client process logs are saved, from the monitoring object directory information 1008 and requests the server computer 111 for a process log reading script 1006 for a directory in the list. As the script for loading a process log reading script 1007 is requested by the process log reading script 1006 to issue a request for a process log reading script 1006 for another directory in the list to the server computer 111, accordingly it sends a next request to the server computer 111.

One approach to generation of a process log reading script for a directory 1006 on the server computer 111 (1009) is to place a web page including the process log reading script 1006 in a directory as an object of monitoring and reading the web page through the process log browsing page 1002. Another approach is to install the process log reading script 1006 as a servlet and map this servlet in each directory as an object of monitoring through the server computer 111.

The process log reading script for a directory 1006 is a script code which is loaded in the frame 1005 of the process log browsing page 1002 by a request from the script for loading a process log reading script 1007 to the server computer 111. The frame 1005 is inserted into the process log browsing page 1002, for example, using the <IFRAME> tag. Another approach is to make the whole process log browsing page 1002 a frame structure using the <FRAMESET> tag and turn the frame 1005 into a child frame using the <FRAME> tag. The process log reading script 1006 accesses the local disk 104 using the web page ID set on the cookie or the ID of the preceding web page contained in the previously read client process log as an access key and if there is a process log corresponding to the access key, it reads the data saved in that process log. If there is no corresponding process log, it instructs the script for loading a process log reading script 1007 to issue a request for a process log reading script for another directory 1006 to the server computer 111.

The process log data storage script 1004 is a script code which stores the client process logs read by the process log reading script 1006.

The process log data shaping and display script 1003 shapes data in the client process logs stored by the process log data storage script 1004 according to the purpose of use of the process log browsing page and displays it on the web browser.

Figure 11:
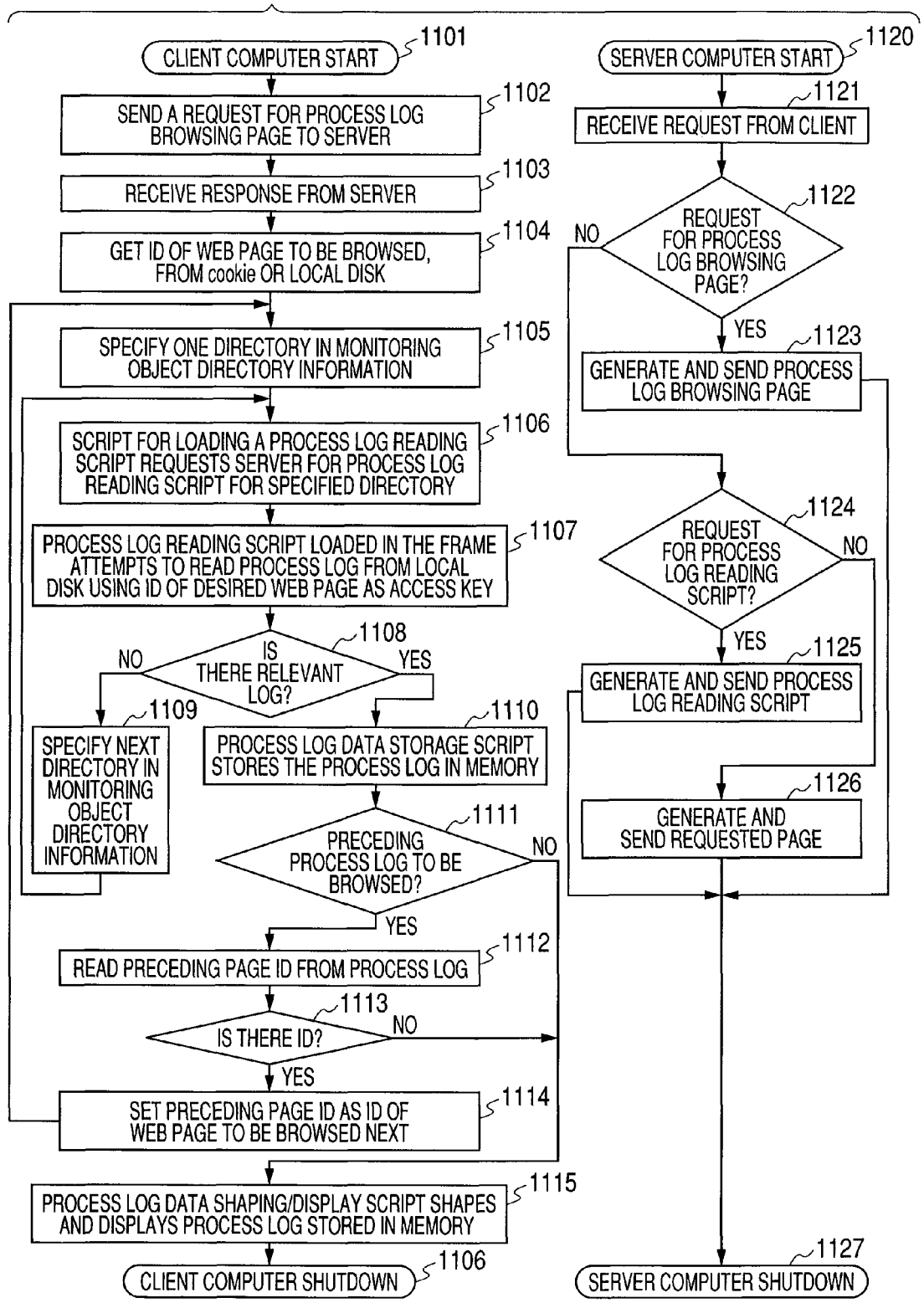
FIG. 11 is a flowchart showing the process log browsing procedure in the method for recording web application processes according to the present invention.

FIG. 11 is a flowchart showing the process log browsing procedure in the method for recording web application processes according to the present invention. The procedure consists of two processing sequences: one on the client computer and one on the server computer.

For browsing client process logs on the client computer, the client computer first sends a request for the process log browsing page to the server computer (Step 1002). It receives response (process log browsing page) from the server computer (Step 1103) and gets the ID of a web page to be browsed from the cookie or local disk (Step 1104), which is meant to specify which part in the process log concerned is first browsed. The ID of the last or preceding web page in client process logs is set on the cookie. Alternatively it is also possible that a list of IDs of web pages in browsable logs among the process logs saved in the local disk is saved in the local disk and the process log to be browsed is specified from the list. The ID obtained at this Step serves as the access key used to first read a client process log from the local disk. Next, the client computer specifies the first one of the directories included in the monitoring object directory information (Step 1105). Then, the script for loading a process log reading script 1007 issues a request for the process log reading script for the specified directory to the server computer (Step 1106). As the process log reading script is loaded in the frame of the process log browsing page from the server computer, the process log reading script attempts to read the client process log from the local disk using the access key read at Step 1104 (Step 1107). If there is no relevant process log, it specifies a next directory in the monitoring object directory information (Step 1109) and returns to Step 1106. If there is a relevant log, the process log data storage script stores the process log in the memory (Step 1110). If a further process log is to be read, the ID of the preceding web page is read from the loaded process log (Step 1112). Unless "none" for the ID, the preceding web page should exist and the ID of the preceding web page is set as the access key for the process log to be next read (Step 1114) and the sequence returns to Step 1105. If "none" for the ID, it means that the last read process log is at the head of the web page access history and the process log data shaping and display script shapes the process log stored in the memory and displays it on the web browser (Step 1115) and ends the sequence. If process log loading is finished at Step 1111, Step 1115 is carried out and the sequence is ended.

At Step 1109, directories in the monitoring object directory information are specified one after another to get the relevant log; if the sequence returns to Step 1109 even after all the directories have been specified, the sequence goes to Step 1115 because no relevant log exists in the local disk, though this is not shown in FIG. 11.

Steps 1105, 1108, and 1109 in FIG. 11 may be omitted by saving directory information along with access keys but in that case a problem related to data storage capacity may arise.

Next, the processing sequence which is performed on the server computer to browse client process logs will be explained.

The server computer receives the request from the client computer (Step 1121). It decides whether it is a request for a process log browsing page (Step 1122) and if so, it generates the page and sends it to the client computer (Step 1123). If it is not such a request but a request for a process log reading script, the server computer generates it and sends it to the client computer (Step 1125). If it is another type of request, the server computer generates a page as requested and sends it to the client computer (Step 1126).

Figure 12:
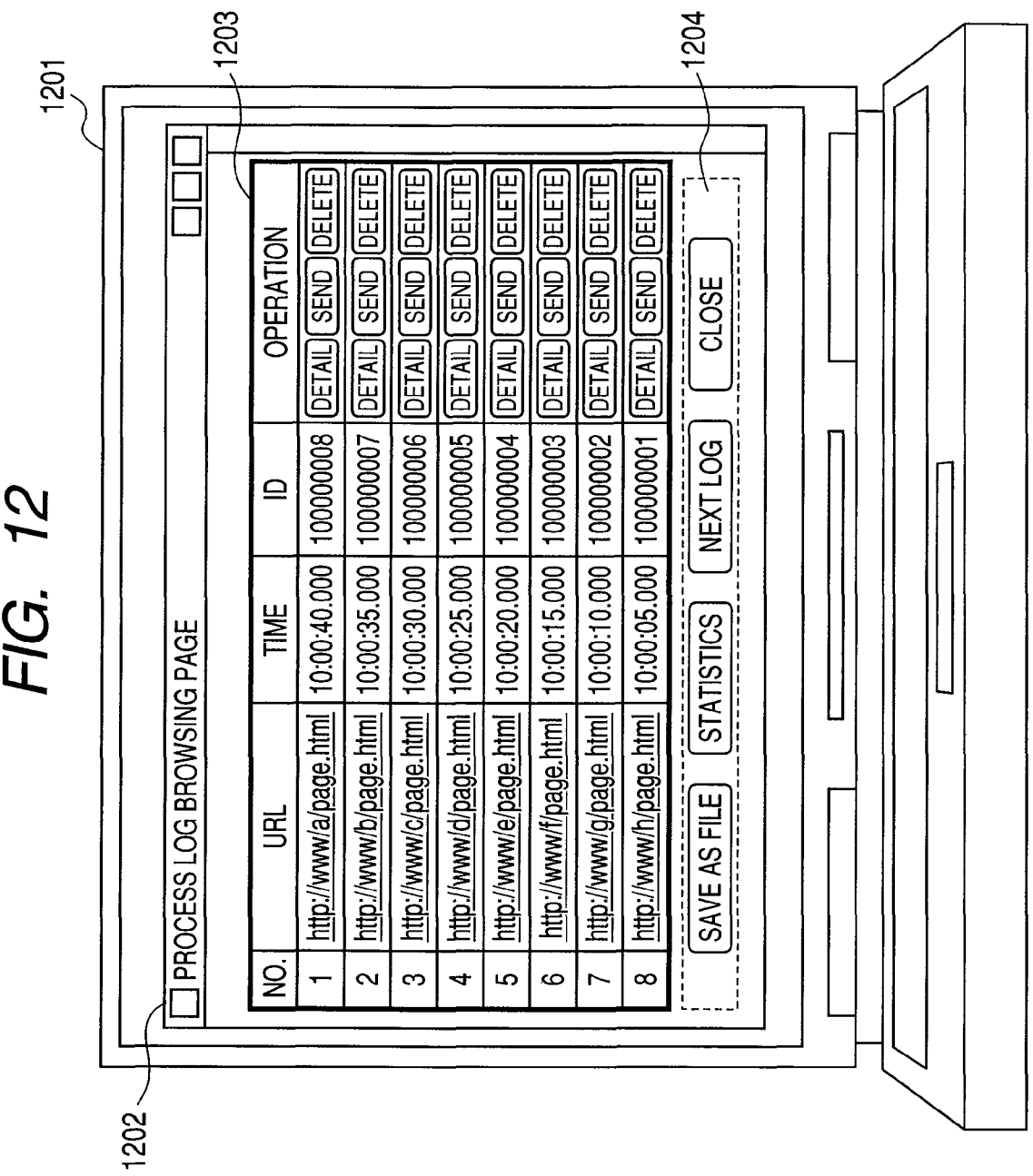
FIG. 12 shows an example of a process log browsing page in the method for recording web application processes according to the present invention.

FIG. 12 shows an example of a process log browsing page in the method for recording web application processes according to the present invention.

The figure illustrates a process log browsing page 1202 listing client process logs on the monitor screen of the client computer 1201. On the process log browsing page, URLs of web pages are listed in the order of access by the client computer along with access time and ID of each web page (1203). The list also includes a button to display client process details for each web page, a button to send the log to the server, and a button to delete the log. The control area 1204 of the process log browsing page contains buttons to save the log as a file, display statistic data on plural logs, load another log and close the browsing page. This process log browsing page enables the user to confirm the history of web page access and also refer to the log of the process in the server computer for a web page with a processing problem using its ID. Some of the items, numerical data and buttons shown in FIG. 12 may be omitted or another browsing page format may be used.

FIG. 13 shows another example of a process log browsing page in the method for recording web application processes according to the present invention.

The figure shows only a list 1301. The list is the same as the one in FIG. 12 in that it shows URLs of web pages which the client computer has accessed, in the order of access, along with time of access and ID of each web page. What is different from the one in FIG. 12 is that it shows click count, communication time, rendering time, and operation (browsing) time.

"Click Count" data can be displayed through the following procedure: click events are counted in the web browser process recording script and the count is once saved in a process log and read from the log.

"Communication Time" data can be displayed through the following procedure: time of occurrence of activate event on a web page and time of occurrence of beforeunload event on the web page accessed last before it are once saved in process logs and then read from the logs to calculate the difference between them.

"Rendering Time" data can be displayed through the following procedure: time of occurrence of activate event on a web page and time of occurrence of load event are once saved in a process log and then read from the log to calculate the difference between them.

"Operation Time" is time except communication time and rendering time and "Operation Time" data can be displayed through the following procedure: time of occurrence of load event on a web page and time of occurrence of beforeunload event are once saved in a process log and then read from the log to calculate the difference between them.

This list 1301 makes it possible to classify problems related to web page response or usability by problem type: namely an increase in communication time may be attributable to the network or server computer, an increase in rendering time may be due to the client computer or web page content, and an increase in operation time may result from a web page content which is less user-friendly or too abundant.

Some of the items or numerical data shown in FIG. 13 may be omitted or another table format may be used.

FIG. 14 shows a further example of a process log browsing page in the method for recording web application processes according to the present invention.

While the examples in FIGS. 12 and 13 show data on access to individual web pages, the example in FIG. 14 shows statistic data as a result of statistical processing of plural client process logs. In the list 1401, URLs of web pages are shown in the descending order of access count. "Access Count" data can be obtained by reading plural client process logs and counting accesses to the same URL or web page. By searching the first and last access times for a web page, the period of access to that web page is known. In addition, communication time, rendering time and operation time data are obtained from the relevant process logs by the procedures mentioned above in reference to FIG. 13 and the average, maximum and minimum values for these data are calculated and displayed, which will be useful to know how frequently the web pages are used or which web page has a problem.

Some of the items and numerical data shown in FIG. 14 may be omitted or another list format may be used.

FIG. 15 explains how a problem in a process log is notified and setup is altered in the method for recording web application processes according to the present invention.

In the example in FIG. 15, a process problem detecting script 1502 and a process setup script 1503 are added to the process log browsing page functions indicated in FIG. 10. The process problem detecting script 1502 has a rule to define a process problem and for example, if there is communication time in excess of a given threshold or the order of web page access is inadequate, it detects a process problem in accordance with the process problem definition rule and sends process problem detection information to the server computer 111. The server computer 111 receives the process problem detection information and displays it on its display device or saves it in its local disk. The process problem detecting script 1502 also has a function to display the log associated with the problem in a color different from the color for the other logs to notify of the problem in the process log data shaping and display script 1003 of the process log browsing page 1501 instead of sending the process problem detection information to the server computer 111.

The process setup script 1503 has a function to alter the method of data shaping or display by the process log data shaping and display script 1003 or alter the process problem definition rule of the process problem detecting script 1502. The process setup script 1503 periodically sends a request to inquire of the server computer 111 whether to alter the setup when the process log content read from the local disk 104 meets a certain condition. The server computer 111 generates a process setup alteration instruction (1505) and sends it to the client computer 101 to update the setup for the process log browsing page periodically. Another possible approach is that the server computer 111 generates a process setup alteration instruction (1505) and sends it to the client computer 101 as necessary. In this case, the process setup for the process log browsing page can be altered at any time convenient for the server computer 111.

As explained so far, in this embodiment, for the web browser to run on the client computer, the server computer inserts a script code for saving a process log in the local disk into a web page as response to a request from the client computer. The server computer also inserts into the web page the ID of the requesting web page and the ID of the trace as a log of the server process of generation of the web page and thus process logs related to web application operation for both the client computer and server computer can be interpreted as a series of process logs. In this sense, the server computer also functions as a process recording apparatus.

Second Embodiment

A method for recording web application processes according to a second embodiment of the present invention will be described referring to FIGS. 16 to 18.

Figure 16:
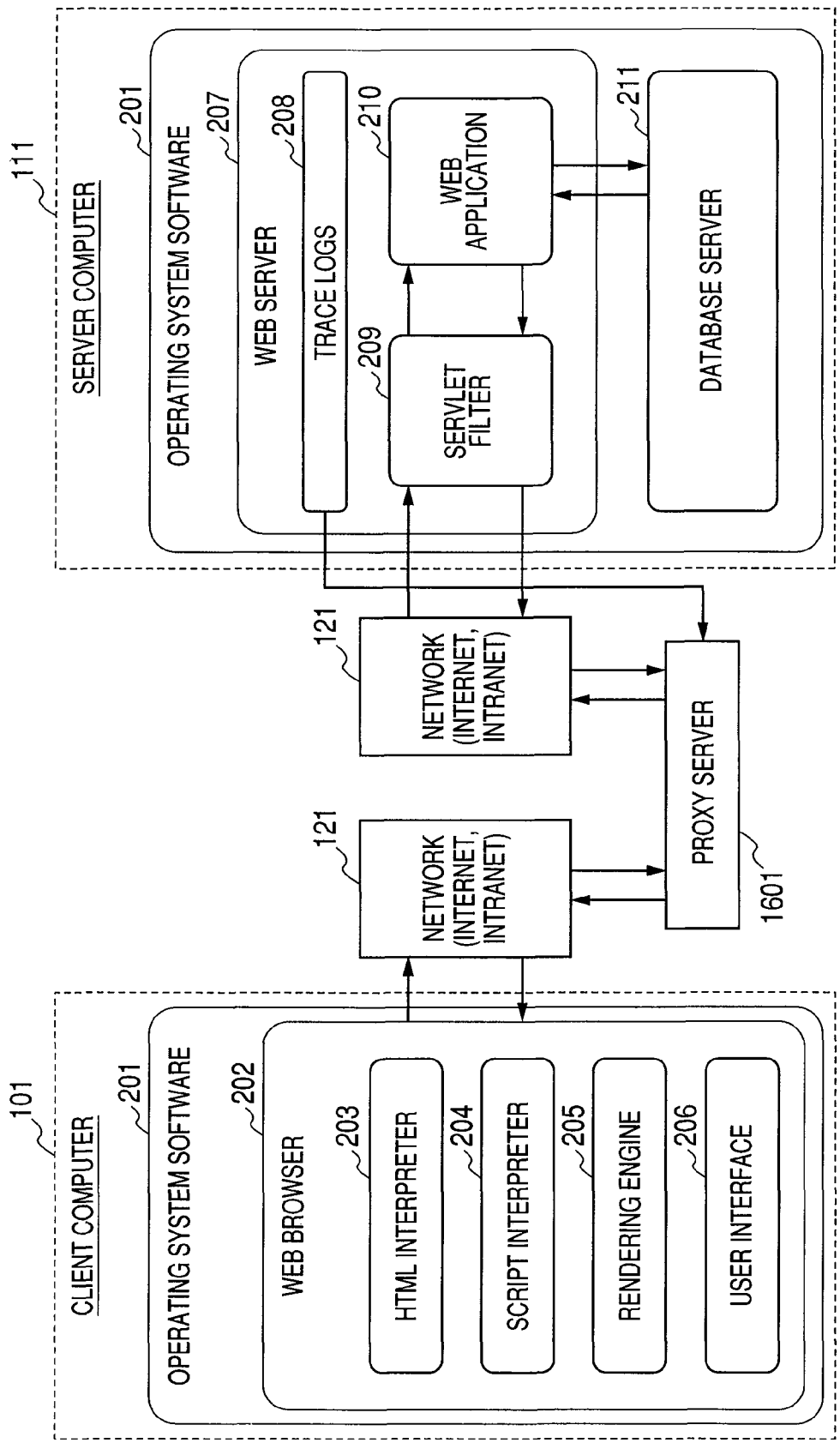
FIG. 16 is a block diagram showing another basic configuration of a web system to which the present invention is applied.

FIG. 16 is a block diagram showing another basic configuration of a web system to which the present invention is applied.

The web system is roughly divided into a client computer 101, a server computer 111, networks 121 connecting these computers, and a proxy server 1601 connecting the networks. Although one client computer 101, one server computer 111, and one proxy server 1602 are shown in FIG. 16, the web system may have two or more client and server computers and proxy servers.

On the client computer 101, a web browser 202 is run on an operating system 201. The web browser 202 includes an HTML interpreter 203, a script interpreter 204, a rendering engine 205, and a user interface 206. The HTML interpreter 203 interprets an HTML document contained in a web page response sent from the server computer 111. The script interpreter 204 interprets and executes the script code contained in the web page response. One example of script code is JAVASCRIPT. The rendering engine 205 creates a web page screen image according to the results of execution by the HTML interpreter 203 and script interpreter 204.

On the server computer 111, a web server 207 and a database server 211 are run on an operating system 201. Although FIG. 16 shows that the web server 207 and database server 211 are run on one operating system 201, instead their server programs may be run on separate operating systems 201. It is also possible that one of the servers is not run or another server (for example, an application server) is run. Also more than one web server 207 or database server 211 may be used. For simple illustration, an application server is not shown in FIG. 16 as it is included in the web server.

In this embodiment, trace logs 208, a servlet filter 209 and a web application 210 reside on the web server 207. The servlet filter 209 receives a request for a web page from the web browser 202 through the networks 121 and the proxy server 1601 and performs filtering on the request as specified and transfers it to the web application 210. It also performs filtering on a web page response received from the web application as specified and sends it back to the web browser 202 through the networks 121 and the proxy server 1601. A functional module, so-called container, which controls communications with the web browser exists between the networks 121 and servlet filter 209, though for simple illustration it is not shown in FIG. 16. The web application 210 generates a web page as requested. The web application 210 is comprised of a servlet and a program such as JSP or EJB (registered trademarks). For simple illustration, individual engines used to run the web application 210 are not shown in FIG. 16. The web application 210 communicates with the database server 211 as necessary to give and receive required data. The trace logs 208 record processing carried out on the web server 207. For example, a process log includes information on: time of receipt of a request from the networks 121, content of a process carried out on the web application 210, ID for communication with the database server 211, content of communication with the database server 211, web application return code, and time of transmission of response from the servlet filter 209 to the networks 121. The database server 211 has a database and returns data in response to a search or update request from the web application 210 or updates the database as necessary.

The proxy server 1601 has a function to connect the networks 121. Usually it is used to connect an Internet and an intranet; in this embodiment, however, it may be used for connection between Internets or between intranets. The proxy server 1601 can receive a trace ID from the trace logs 208 running on the web server 207 of the server computer 111. As shown in FIG. 16, an exclusive communication line from the trace logs 208 to the proxy server 1601 is provided, though instead a trace ID may be received through the network 121.

Figure 17:
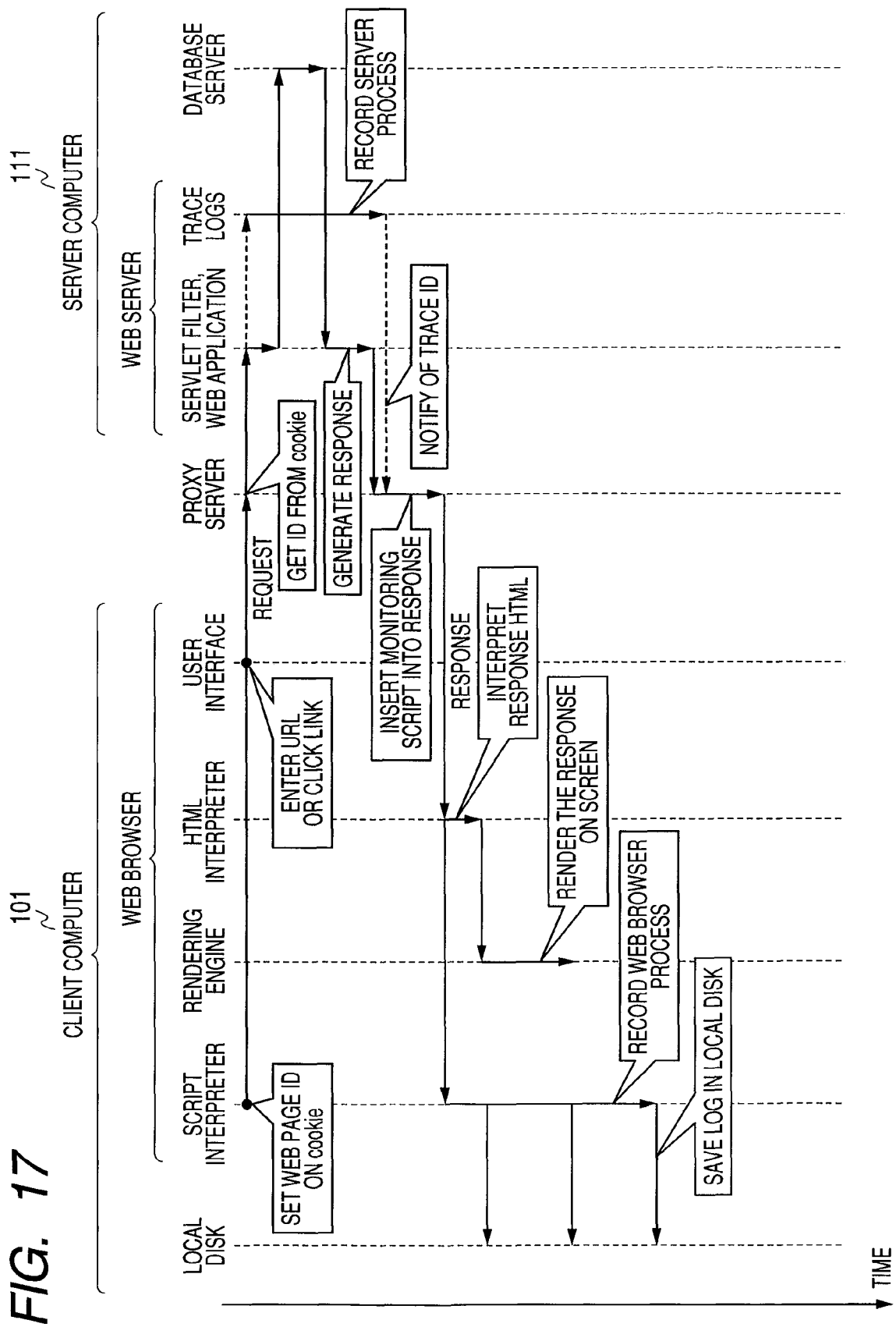
FIG. 17 is a sequence chart showing another method for recording a client process in the method for recording web application processes according to the present invention.
Figure 18:
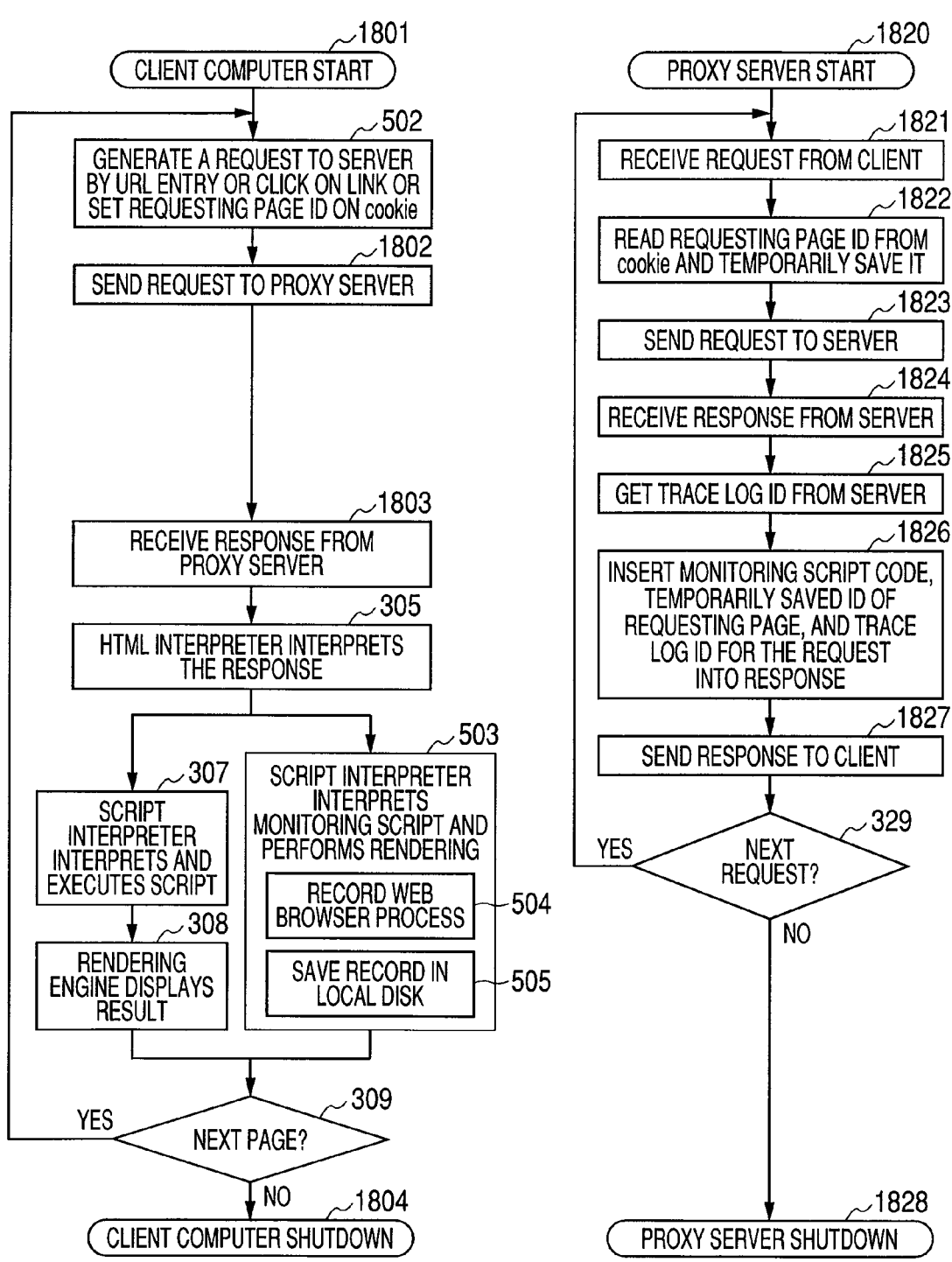
FIG. 18 is a flowchart showing another method for recording a client process in the method for recording web application processes according to the present invention.

FIGS. 17 and 18 are respectively a sequence chart and a flowchart showing another procedure of recording a client process, in the method for recording web application processes according to the present invention.

First, when generating a request for a web page on the web browser, the ID of the web page issuing the request is set on a cookie which enables communication of a small volume of data with the server computer, using the script code included in the requesting web page (Step 502). This ID is the ID of a trace as a log of a process on the server computer or a value which corresponds to it on one-on-one basis. If no web page is displayed on the web browser and a request for the web page is generated by entering the URL of the web page directly, no value is set on the cookie. If the requesting web page is not a web page for which client processes are recorded according to the present invention or it is a web page sent to the client computer before the function of inserting a client process recording script code into the response is started on the proxy server, no value is set on the cookie. After that, the request is sent to the proxy server through the network (Step 1802).

As the proxy server receives the request from the client computer (Step 1821), it reads the ID of the requesting web page from the cookie for the request sent from the client computer and temporarily saves it in the memory (Step 1822). Then, it sends the request to the server computer (Step 1823). As the web application running on the server computer receives the request for the web page from the proxy server through the network, it communicates with the database server as necessary to generate a response as the requested web page and sends it to the proxy server. The proxy server receives the response from the server computer through the network (Step 1824). The server computer records the process on the server computer as a trace and assigns an ID to the trace. The trace ID varies from one web page request to another or is unique.

The proxy server gets the ID of the trace as a log of the server process for generation of the response, from the trace log (Step 1825). Then, it inserts into the response a monitoring script code for recording processes on the client computer, the ID of the requesting web page temporarily saved in the memory, and the ID of the trace as a log of the server process for generation of the response or a value corresponding to the ID on one-on-one basis as the ID of the requested web page (Step 1826).

The monitoring script code is, for example, a program code described in JAVASCRIPT and inserted into the response HTML using <SCRIPT> tag. The monitoring script code has a function to record an event generated when the web browser receives a response from the server computer or when rendering of the response on the web browser is finished, or when the mouse or keyboard is operated or a request for a next web page is sent and it also has a function to save process logs in the local disk of the client computer together with time of occurrence of the event and the web page ID. Another approach to inserting a web page ID into the response is to set it as a variable in the monitoring scrip code.

Next, the proxy server sends the response to the client computer (Step 1827). As the client computer receives the response from the proxy server through the network (Step 1803), the HTML interpreter interprets the response (Step 305) and the script interpreter interprets and executes the script code (Step 307) and the rendering engine displays the processing result (Step 308). The script interpreter also interprets the monitoring script code inserted into the response on the proxy server and executes it (Step 503). Step 503 includes two steps: recording a web browser process (Step 504) and saving the record in the local disk (Step 505). Steps 503, 307 and 308 may be carried out concurrently depending on the location of script code in response HTML or time of web browser process execution or time of occurrence of an event.

Lastly, if there is a request for a next web page to be sent to the proxy server, the sequence returns to Step 502. If there is no request for a next web page and the web browser should be exited, the sequence goes to Step 1804.

In the second embodiment, the procedure of recording a client process, that of saving in the local disk, that of assigning an ID and that of browsing and displaying process logs are the same as in the first embodiment.

As explained so far, in the second embodiment, it is the proxy server that inserts, into the web page as a response from the server computer, a script code for saving in the local disk a process log for execution by the client computer, and the ID of the web page requesting the web page, and the ID of the trace as a log of the server process for the web page. Therefore, the proxy server in this embodiment may be considered to be a process recording apparatus.

According to the present invention, it is unnecessary to install a certain kind of tool in the client computer or modify the web application of the server computer, and processes on the client computer can be recorded in a simple manner by altering the setup of the server computer, so that if a problem occurs, the whole web system can be easily checked to find the cause. Particularly since a value which corresponds to the ID of a trace as a server computer process log is saved together with the relevant client computer process log, which operation on the server computer is related to the problem in the client computer can be easily found, offering key technology to assure high availability in web system operation. Furthermore, according to the present invention, process logs are saved in the client computer's local disk and thus even when the number of client computers increases, processes are recorded without further burdens on the server computer and networks. This means that the invention can be applied to operation and management of a large scale system.

What is claimed is:

1. A method for recording web application processes in a computer system, the computer system comprising a client computer, a server computer, and a network connecting the client computer and the server computer, wherein processes on the client computer and server computer in running a web application are recorded in the computer system, the method comprising the steps of:
  inserting, by the server computer, a script code for recording a process on the client computer into a first web page;
  executing, by the client computer, the inserted script code on a web browser;
  saving a process log in a local disk of the client computer;
  tracing, by the server computer, a process on the server computer when generating the first web page as requested by the client computer, and recording the process as a trace;
  assigning, by the server computer, an identification to the trace;
  inserting, by the server computer, the identification or a value corresponding to the identification as an identification of the first web page requested by the client computer into a response to the request for the first web page;
  issuing a request, by the first web page, for a second web page, the first web page being a requesting web page, and the second web page being the requested web page;
  sending, by the client computer, an identification of the requesting web page to the server computer when the requesting web page requests the server computer for a web page,
  wherein the identification of the requesting web page is an identifier that is unique to each of a plurality of web pages; and
  inserting, by the server computer, the identification of the requesting web page into a response for the requested web page.

2. The method for recording web application processes according to claim 1, wherein the process log saved in a local disk of the client computer contains information on a time of occurrence of a process on the requested web page, identification of the requested web page, and identification of a web page preceding the requested web page, as a web page requesting the requested web page.

3. The method for recording web application processes according to claim 2, wherein the process log saved in the local disk of the client computer can be read or written only from a web page in the same directory as the first web page including a script code used for the process log.

4. The method for recording web application processes according to claim 3, further comprising the steps of:
  generating, by the server computer, a web page for browsing process logs saved in the local disk of the client computer;
  requesting, by the client computer, the web page for browsing the process logs from the server computer, and receiving the web page for browsing the process logs from the server computer;
  executing, by the client computer, the web page for browsing the process logs on a web browser to read the process log; and
  displaying, by the client computer, the web page for browsing the process logs on the web browser.

5. The method for recording web application processes according to claim 4,
  wherein the web page for browsing the process logs saved in the local disk of the client computer includes a list of directories containing web pages having processes that are recorded, and a frame in which a script code for reading the process logs is loaded,
  wherein the method further comprises the steps of:
  selecting, by the web browser, directories from the list of directories successively;
  loading, by the web browser, a script code for reading process logs in the directories into the frame;
  reading, by the web browser, the process logs of the web pages in the directories; and
  displaying, by the web browser, a list of the web pages having processes that are recorded, and identifications of the web pages on the web browser.

6. The method for recording web application processes according to claim 4, wherein the web page for browsing the process logs saved in the local disk of the client computer comprises at least one of a means to display, from read process logs, a list of web pages having processes that are recorded and details of the process logs for the web pages, a means to delete a process log, and a means to send details of the process logs to the server computer.

7. The method for recording web application processes according to claim 4, wherein the web page for browsing the process logs saved in the local disk of the client computer displays on the web browser, from read process logs, a list of web pages having processes that are recorded, and at least one of a time of the process log of each web page, a time from when the web browser sends a request for a web page until the web browser receives a response, a time required to display a web page on the web browser, and a time from receipt of response for a web page to transmission of a next request.

8. The method for recording web application processes according to claim 4, wherein the web page for browsing the process logs saved in the local disk of the client computer displays on the web browser, from read process logs, a list of web pages whose processes are recorded, and at least one the number of displays of a web page on the web browser, a first display time of a web page, a last display time of a web page, an average, a maximum or a minimum time from when the web browser sends a request for a web page until the web browser receives a response, an average, a maximum or a minimum time required to display a web page on the web browser, and time from receipt of response for a web page to transmission of a next request.

9. The method for recording web application processes according to claim 4, wherein the web page for browsing the process logs saved in the local disk of the client computer includes a script code for deciding whether a read process log has a problem or not and has a function to show, if after reading a process log, a problem is found by execution of the script code, existence of the problem on the web browser or notify that the server computer has a problem.

10. The method for recording web application processes according to claim 4, wherein the web page for browsing the process logs saved in the local disk of the client computer includes at least either a script code with a function to inquire of the server computer about setup for recording processes, or a script code with a function to receive setup for recording processes from the server computer, and a processing method on the web page is altered in accordance with the setup for recording processes which is received from the server computer by communication with the server computer.

11. A method for recording web application processes in a computer system, the computer system comprising a client computer, a proxy server, a server computer, and a network connecting the client computer, the proxy server, and the server computer, wherein processes on the client computer and server computer in running a web application are recorded, the method comprising the steps of:
   inserting, by the proxy server, a script code for recording a process on the client computer into a first web page sent from the server computer to the client computer;
   executing, by the client computer, the inserted script code on a web browser;
   saving a process log in a local disk of the client computer;
   tracing, by the server computer, a process on the server computer when generating the first web page as requested by the client computer, and recording the process as a trace;
   assigning, by the server computer, an identification to the trace, the identification or a value corresponding to the identification being taken as the identification of the first web page requested by the client computer;
   issuing a request, by the first web page, for a second web page, the first web page being a requesting web page, and the second web page being the requested web page;
   when the requesting web page requests the server computer for a web page, sending, by the client computer, an identification of the requesting web page to the server computer;
   notifying, by the server computer, the proxy server of identification of the requesting web page and identification of the requested web page,
   wherein the identification of the requesting web page is an identifier that is unique to each of a plurality of web pages; and
   inserting, by the proxy server, the notified identifications into a web page sent from the server computer to the client computer.

12. The method for recording web application processes according to claim 11, wherein the process log saved in a local disk of the client computer contains information on a time of occurrence of a process on the requested web page, identification of the requested web page, and identification of a web page preceding the requested web page, as a web page requesting the requested web page.

13. The method for recording web application processes according to claim 12, wherein the process log saved in the local disk of the client computer can be read or written only from a web page in the same directory as the first web page including a script code used for the process log.

14. The method for recording web application processes according to claim 13, further comprising the steps of:
   generating, by the server computer or the proxy server, a web page for browsing process logs saved in the local disk of the client computer;
   requesting, by the client computer, the web page for browsing the process logs from the server computer or the proxy server, and receiving the web page for browsing the process logs from the server computer or the proxy server;
   executing, by the client computer, the web page for browsing the process logs on a web browser to read the process log; and
   displaying, by the client computer, the web page for browsing the process logs on the web browser.

15. The method for recording web application processes according to claim 14,
   wherein the web page for browsing the process logs saved in the local disk of the client computer includes a list of directories containing web pages whose processes are recorded and a frame in which a script code for reading the process logs is loaded,
   wherein the method further comprises the steps of:
   selecting, by the web browser, directories from the list of directories successively;
   loading, by the web browser, the script code for reading process logs in the directories into the frame;
   reading, by the web browser, the process logs of the web pages in the directories; and
   displaying the process logs of the web pages on the web browser.

16. The method for recording web application processes according to claim 14, wherein the web page for browsing the process logs saved in the local disk of the client computer displays on the web browser, from loaded process logs, a list of web pages whose processes are recorded, and at least one of an identification of each of a plurality of web pages, a time of a process log of each web page, a time from when the web browser sends a request for a web page until the web browser receives a response, a time required to display a web page on the web browser, and a time from receipt of response for a web page to transmission of a next request.

* * * * *